US012456845B1

(12) United States Patent
Wang et al.

(10) Patent No.: US 12,456,845 B1
(45) Date of Patent: Oct. 28, 2025

(54) UNIVERSAL JACK OPENING

(71) Applicant: CommScope Technologies LLC, Hickory, NC (US)

(72) Inventors: Jing Wang, Suzhou (CN); Wenyong Wu, Suzhou (CN)

(73) Assignee: CommScope Technologies LLC, Claremont, NC (US)

(*) Notice: Subject to any disclaimer, the term of this patent is extended or adjusted under 35 U.S.C. 154(b) by 341 days.

(21) Appl. No.: 18/002,256

(22) PCT Filed: Jul. 2, 2021

(86) PCT No.: PCT/US2021/040354

§ 371 (c)(1), (2) Date: Dec. 16, 2022

(87) PCT Pub. No.: WO2022/006544

PCT Pub. Date: Jan. 6, 2022

(30) Foreign Application Priority Data

Jul. 2, 2020 (CN) ........................ 202010634767.5
Jul. 2, 2020 (CN) ........................ 202021290046.9

(51) Int. Cl.
*H01R 13/74* (2006.01)
*H01R 13/627* (2006.01)
*H01R 24/64* (2011.01)

(52) U.S. Cl.
CPC ....... *H01R 13/743* (2013.01); *H01R 13/6273* (2013.01); *H01R 24/64* (2013.01); *H01R 2201/16* (2013.01)

(58) Field of Classification Search
CPC .. H01R 13/743; H01R 13/6273; H01R 24/64; H01R 13/627; H01R 13/74
USPC ........................................................ 439/676
See application file for complete search history.

(56) References Cited

U.S. PATENT DOCUMENTS 4,875,881 A 10/1989 Caveny et al.
5,041,018 A 8/1991 Arnett
5,096,439 A 3/1992 Arnett
5,096,442 A 3/1992 Arnett et al.
(Continued)

FOREIGN PATENT DOCUMENTS

FR 2 701 345 A1 8/1994
FR 3018143 A3 9/2015
(Continued)

OTHER PUBLICATIONS

Extended European Search Report for EP21834445.5 mailed Jun. 21, 2024.
(Continued)

*Primary Examiner* — Gary F Paumen
(74) *Attorney, Agent, or Firm* — Merchant & Gould P.C.

(57) ABSTRACT

An opening structure for receiving a telecommunications jack can include a main body defining a central passageway, a first attachment arrangement for securing a first jack type to the main body within the central passageway, a second attachment arrangement for securing a second jack type to the main body within the central passageway, and a third attachment arrangement for securing a third jack type to the main body within the central passageway, wherein the first, second, and third jack types have different connection arrangements for facilitating connection to an opening structure.

19 Claims, 31 Drawing Sheets

(56) References Cited

U.S. PATENT DOCUMENTS

| | | | | | |
|---|---|---|---|---|---|
| 5,108,053 | A | | 4/1992 | Biederstedt | |
| 5,238,426 | A | | 8/1993 | Arnett | |
| 5,356,311 | A | * | 10/1994 | Liu | H01R 13/741 439/540.1 |
| 5,501,608 | A | | 3/1996 | Scheer et al. | |
| 5,599,190 | A | | 2/1997 | Willette | |
| 5,658,166 | A | * | 8/1997 | Freeman | H01R 13/518 439/540.1 |
| 5,897,395 | A | | 4/1999 | Arnett | |
| 6,373,944 | B1 | * | 4/2002 | Beavers | H04M 1/0293 379/438 |
| 6,623,170 | B2 | | 9/2003 | Petrillo | |
| 7,056,157 | B2 | | 6/2006 | Herring et al. | |
| 7,131,864 | B2 | * | 11/2006 | Peng | H01R 31/06 439/536 |
| 7,690,921 | B2 | | 4/2010 | Timmins et al. | |
| 8,105,097 | B2 | | 1/2012 | Thijs et al. | |
| 8,341,810 | B2 | | 1/2013 | Rayos | |
| 9,326,418 | B2 | | 4/2016 | Knight | |
| 9,577,396 | B2 | | 2/2017 | Plamondon et al. | |
| 9,640,960 | B2 | | 5/2017 | Makwinski et al. | |
| 9,887,500 | B2 | * | 2/2018 | Riner | H01R 24/78 |
| 10,181,675 | B1 | | 1/2019 | Anderson | |
| 2002/0031955 | A1 | | 3/2002 | Schmidt et al. | |
| 2003/0096536 | A1 | | 5/2003 | Clark et al. | |
| 2006/0019533 | A1 | | 1/2006 | Peng | |
| 2008/0050967 | A1 | | 2/2008 | Poulin | |
| 2009/0093166 | A1 | | 4/2009 | Fogg et al. | |
| 2010/0227493 | A1 | | 9/2010 | Guy et al. | |
| 2012/0196472 | A1 | | 8/2012 | Fitzpatrick | |
| 2013/0337687 | A1 | | 12/2013 | Weinmann et al. | |
| 2014/0220794 | A1 | | 8/2014 | Taylor et al. | |
| 2016/0056547 | A1 | | 2/2016 | Fransen et al. | |
| 2016/0080836 | A1 | | 3/2016 | Carreras Garcia | |

FOREIGN PATENT DOCUMENTS

| | | | |
|---|---|---|---|
| JP | 2002-184534 | A | 6/2002 |
| JP | 2010-34049 | A | 2/2010 |

OTHER PUBLICATIONS

International Search Report and Written Opinion for Application No. PCT/US2021/040354 mailed Oct. 27, 2021.

International Search Report and Written Opinion for Application No. PCT/US2021/040362 mailed Oct. 27, 2021.

* cited by examiner

PRIOR ART

UNIVERSAL JACK OPENING

CROSS-REFERENCE TO RELATED APPLICATIONS

This application is being filed as a National Stage Application of PCT International Patent Application PCT/US2021/040354, filed on 2 Jul. 2021, claims the benefit of Chinese Patent Application No. 202010634767.5, filed on Jul. 2, 2020, and claims the benefit of Chinese Patent Application No. 202021290046.9, filed on Jul. 2, 2020, the disclosures of which are incorporated herein by reference in their entireties.

BACKGROUND

Telecommunications connectors are manufactured to various specifications and standards. For example, specifications and standards exist for connecting modular jacks within openings defined by, for example, panels and plates. One industry-wide standard exists for what is typically referred to as a "keystone jack" in which a flexible tab is provided on the top of the jack, among other structural features, that allows the jack to be snapped into a mounting plate. Manufacturers have also defined their own specifications for proprietary and non-proprietary jack types. It is typically the case that a jack made to one specification cannot be used with an opening made to a different specification. Accordingly, this lack of cross-compatibility reduces flexibility and requires manufacturers to maintain large inventories.

With reference to FIG. 67, a keystone jack 10, configured as an RJ-type jack, is presented. As shown, the jack 10 includes a main body 12 and a single-sided deflectable latch member 14 located on one side of the main body 12. A single-sided fixed latch member 16 is provided on the side of the main body 12 opposite the latch member 14. In one aspect, the latch members 14, 16 are separated by a height H1 which allows the jack to be inserted into an opening of the same height. In one example, the height H1 is about 19.5 mm. A pair of oppositely positioned side stops 18 are also provided on the other two sides of the main body 12. When the jack 10 is inserted into an opening, the latch members 14, 16 prevent the jack 10 from being removed in a first direction D1. The side stops 18 prevent the jack 10 from being removed from the opening in a second direction D2 opposite the first direction D1. Accordingly, the combination of the latch members 14, 16 and the side stops 18 function to securely hold the jack 10 within an opening such that the jack 10 cannot be moved in either of the first and second directions D1, D2. When the latch member 14 is sufficiently depressed, the jack 10 can be removed from the opening in the first direction D1.

With reference to FIG. 68, a jack module 20 referred to as an SL series jack, also configured as an RJ-type jack, and manufactured by CommScope, Inc., the assignee of the present application, is presented. As shown, the jack 20 includes a main body 22 and a double-sided deflectable latch member 24 located on one side of the main body 22. A double-sided fixed latch member 26 is provided on the side of the main body 22 opposite the latch member 24. In one aspect, the latch members 24, 26 are separated by a height H2 which allows the jack to be inserted into an opening of the same height. In one example, the height H2 is about 20.3 mm. As the latch members 24, 26 are double-sided and form a channel that abuts each side of a wall defining the opening within which the jack 20 is installed, the latch members 24, 26 prevent the jack 20 from being removed from the opening in either the first or second direction D1, D2. Accordingly, the jack 20 differs from the jack 10 in that side stops need not be provided for the jack 20. When the latch member 24 is sufficiently depressed, the jack 10 can be removed from the opening in the first direction D1. As the height H1 associated with a keystone style jack is different than the height H2 associated with an SL style jack, each style jack must typically be used with an opening structure specifically dimensioned for that style of jack.

With reference to FIG. 69, a jack module 30 referred to as an M series jack, also configured as an RJ-type jack, and manufactured by CommScope, Inc., the assignee of the present application, is presented. As shown, the jack 30 includes a main body 32 and a pair of oppositely positioned single-sided deflectable latch members 34 located on each side of the main body 32. A pair of oppositely positioned side stops 36 are also provided on the same two sides of the main body 12 on which the latch members 34 are provided. When the jack 30 is inserted into an opening, the latch members 34 prevent the jack 30 from being removed in the first direction D1. The side stops 36 prevent the jack 30 from being removed from the opening in the second direction D2 opposite the second direction D2. Accordingly, the combination of the latch members 34 the side stops 36 function to securely hold the jack 30 within an opening such that the jack 10 cannot be moved in either of the first and second directions D1, D2. When the latch members 34 are sufficiently depressed, the jack 30 can be removed from the opening in the first direction D1. As the latching approach used with an M series style jack is completely different than that used for keystone and SL type jacks, M series style jacks cannot be used with openings configured for keystone and SL style jacks, and vice versa.

Other types of jack styles with differing latch systems also exist that similarly require openings configured specifically for that style of jack.

SUMMARY

An opening structure for receiving a telecommunications jack can include a main body defining a central passageway, a first attachment arrangement for securing a first jack type to the main body within the central passageway, a second attachment arrangement for securing a second jack type to the main body within the central passageway, and a third attachment arrangement for securing a third jack type to the main body within the central passageway, wherein the first, second, and third jack types have different connection arrangements for facilitating connection to an opening structure.

In some examples, the first attachment arrangement includes at least one rear-facing surface of the main body acting as a stop surface for side stops of the first jack type, and includes an upper edge and a lower edge located at opposite sides of the central passageway for engaging with single-sided latch members of the first jack type.

In some examples, the first jack type is a keystone type jack.

In some examples, the second attachment arrangement includes oppositely positioned recesses and catch surfaces located on opposite sides of the central passageway, the catch surfaces being for engaging laterally positioned latch members of the second jack type.

In some examples, the second jack type is a COMMSCOPE M-series type jack.

In some examples, the third attachment arrangement includes only the upper and lower edges for engaging with double-sided latch members of the third jack type.

In some examples, the third jack type is a COMMSCOPE SL-series type jack.

In some examples, the first, second, and third attachment arrangements are integrally formed with the main body.

In some examples, the main body includes a deflectable latch member.

In some examples, the deflectable latch member includes a pair of deflectable latch members.

In some examples, the deflectable latch member forms at least a portion of the first and third attachment arrangements.

In some examples, an adapter part can be further included for installation on the first jack type and for connection with the first attachment arrangement.

An opening structure for receiving a telecommunications jack can include a main body defining a central passageway, a lower edge located at a lower side of the central passageway, a deflectable latch member located opposite the lower edge and at an upper side of the central passageway, a rear-facing surface oriented orthogonally to the central passageway, and a pair of catch surfaces located on lateral sides of the central passageway. In one aspect, when a first jack type is installed in the central passageway, the first jack type engages with the lower edge and the deflectable latch member and against the rear-facing surface. In one aspect, when a second jack type is installed in the central passageway, the second jack type engages with the pair of catch surfaces and against the rear-facing surface. In one aspect, when a third jack type is installed in the central passageway, the third jack type engages with the lower edge and the deflectable latch member without the third jack type abutting the rear-facing surface.

In some examples, the first jack type is a keystone type jack.

In some examples, the second jack type is a COMMSCOPE M-series type jack.

In some examples, the third jack type is a COMMSCOPE SL-series type jack.

In some examples, the lower edge, deflectable latch member, rear-facing surface, and the pair of catch surfaces are integrally formed with the main body.

In some examples, the deflectable latch member includes a pair of deflectable latch members.

A telecommunications jack connection kit can include a main body defining a central passageway, the main body defining a first attachment arrangement for securing a first jack type to the main body within the central passageway and a second attachment arrangement for securing a second jack type to the main body within the central passageway. An adapter can be included for connection to a third jack type, the adapter being configured for connection to the first attachment arrangement. In one aspect, the first, second, and third jack types have different connection arrangements for facilitating connection to an opening structure.20. The telecommunications jack connection kit of claim 19, wherein the first attachment arrangement includes an upper edge and a lower edge located at opposite sides of the central passageway for engaging with single-sided latch members of the first jack type.

In some examples, the first jack type is a keystone type jack.

In some examples, the second attachment arrangement includes oppositely positioned recesses and catch surfaces located on opposite sides of the central passageway, the catch surfaces being for engaging laterally positioned latch members of the second jack type.

In some examples, the second jack type is a COMMSCOPE M-series type jack.

In some examples, the third jack type is a COMMSCOPE SL-series type jack.

In some examples, the first and second attachment arrangements are integrally formed with the main body.

An adapter for enabling a telecommunications jack of a first type to be mounted within an opening configured for a second type of telecommunications jack can include a main body defining a top wall, a first sidewall, and a second sidewall; a deflectable latch extending from the top wall; a first opening within the first sidewall for receiving a first side stop of the telecommunications jack; and a second opening within the second sidewall for receiving a second side stop of the telecommunications jack; wherein the main body has one order of rotational symmetry.

In some examples, the adapter includes a first side stop extending orthogonally from the first sidewall in a direction away from the second sidewall and a second side stop extending orthogonally from the second sidewall in a direction away from the first sidewall.

In some examples, the top wall includes slots adjacent the deflectable latch.

In some examples, the first opening is a fully enclosed opening and the second opening is an unenclosed opening.

In some examples, the first opening is located closer to the top wall in comparison to the second opening.

In some examples, the first side stop is located closer to the top wall in comparison to the second side stop.

In some examples, the adapter includes a first bottom wall portion extending orthogonally from the first sidewall in a direction towards the second sidewall and a second bottom wall portion extending orthogonally from the second sidewall in a direction towards the first sidewall.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
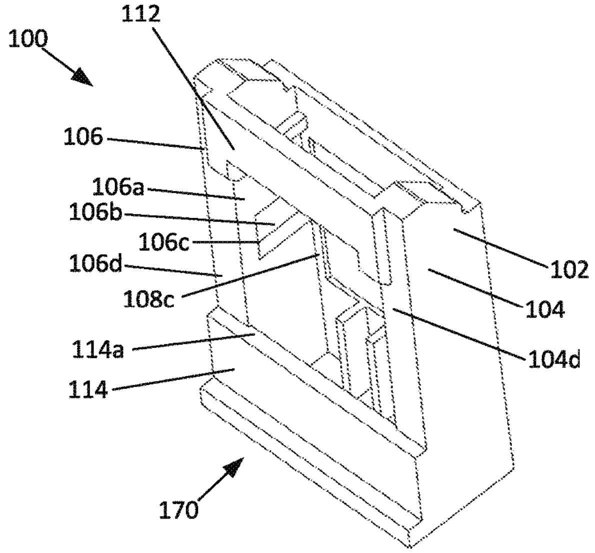
FIG. 1 is a rear top perspective view of a first opening structure having features in accordance with the present disclosure.
Figure 2:
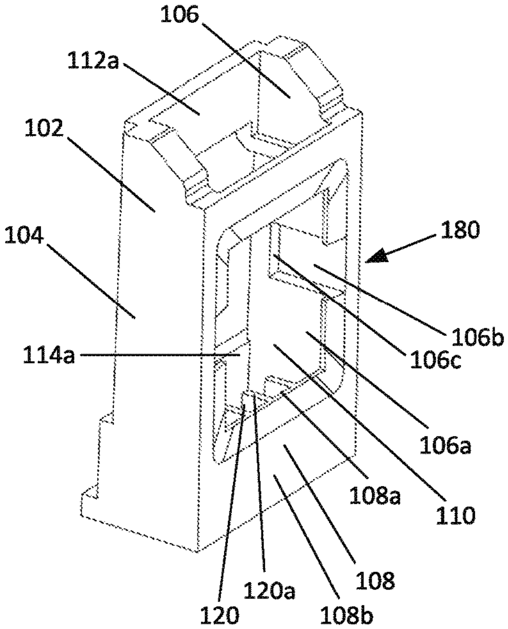
FIG. 2 is a front top perspective view of the opening structure of FIG. 1.
Figure 3:
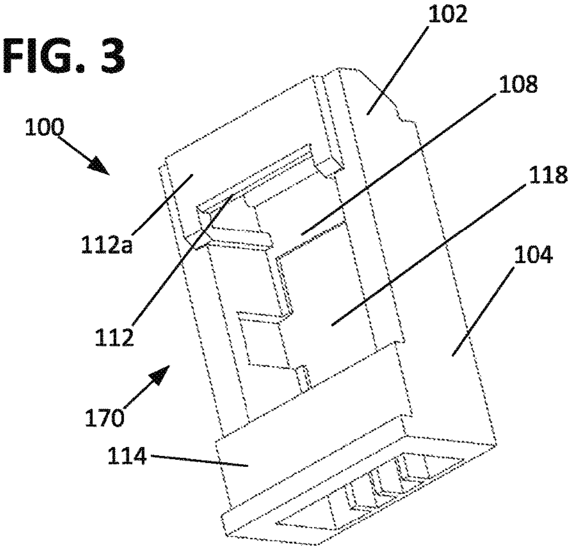
FIG. 3 is a rear bottom perspective view of the opening structure of FIG. 1.
Figure 4:
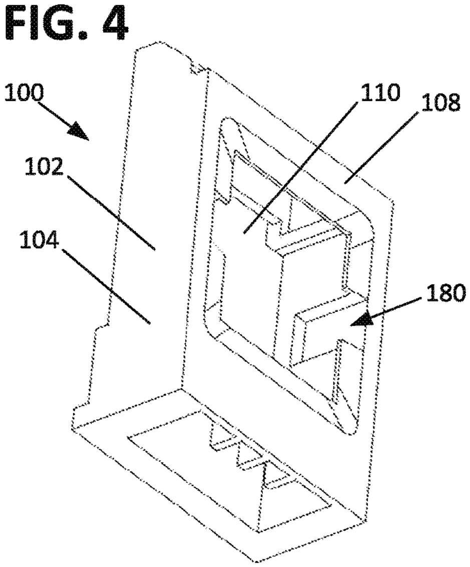
FIG. 4 is a front bottom perspective view of the opening structure of FIG. 1.
Figure 5:
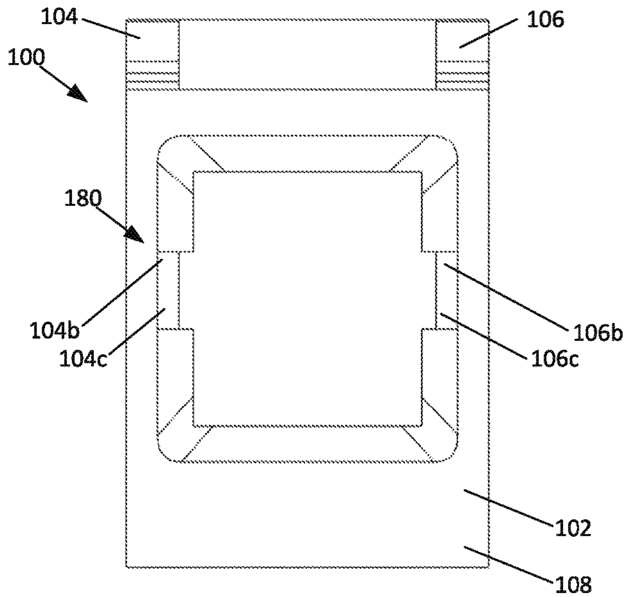
FIG. 5 is a front view of the opening structure of FIG. 1.
Figure 6:
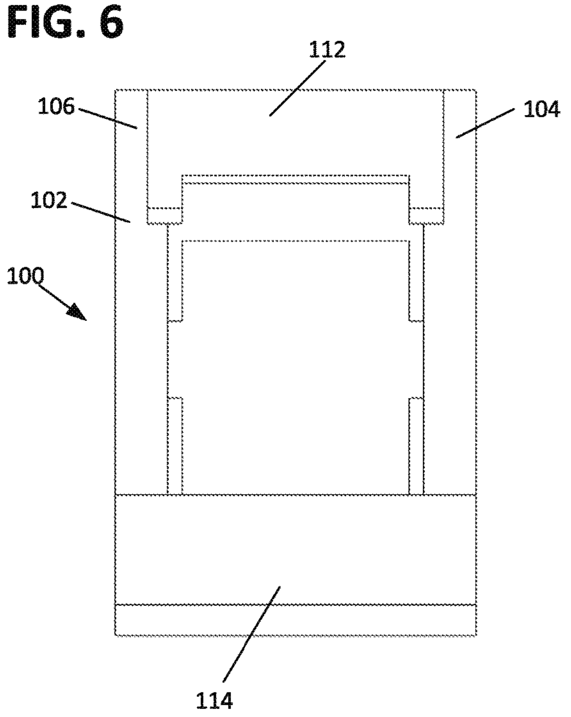
FIG. 6 is a rear view of the opening structure of FIG. 1.
Figure 7:
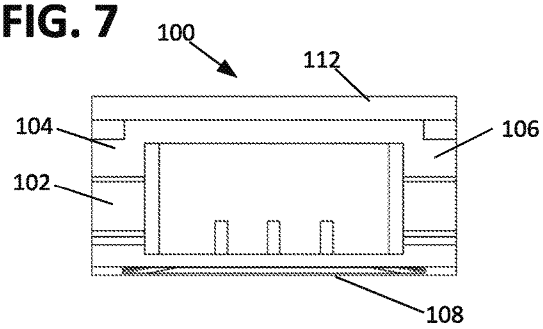
FIG. 7 is a top view of the opening structure of FIG. 1.
Figure 8:
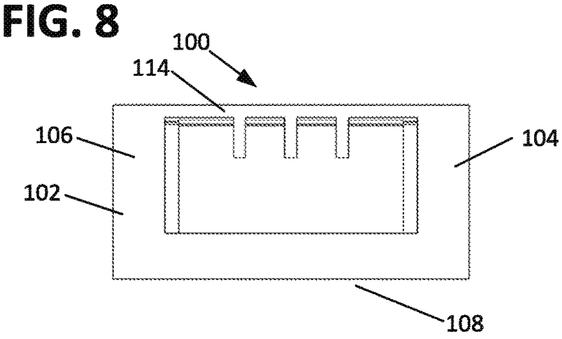
FIG. 8 is a bottom view of the opening structure of FIG. 1.
Figure 9:
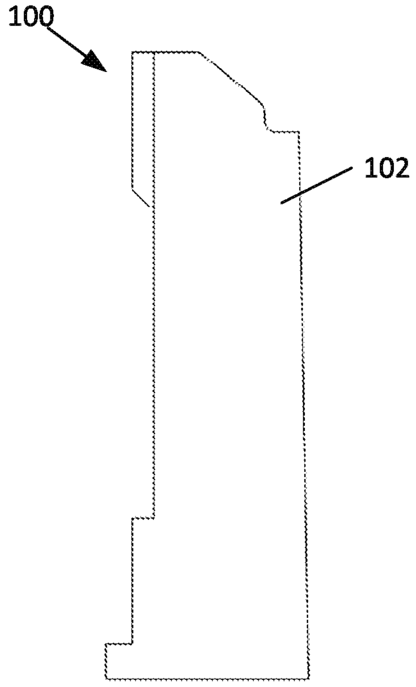
FIG. 9 is a side view of the opening structure of FIG. 1.
Figure 10:
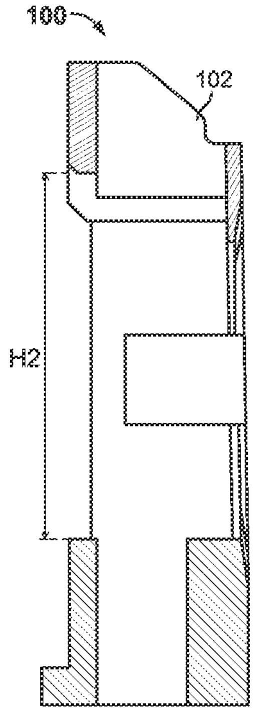
FIG. 10 is a cross-sectional side view of the opening structure of FIG. 1.
Figure 11:
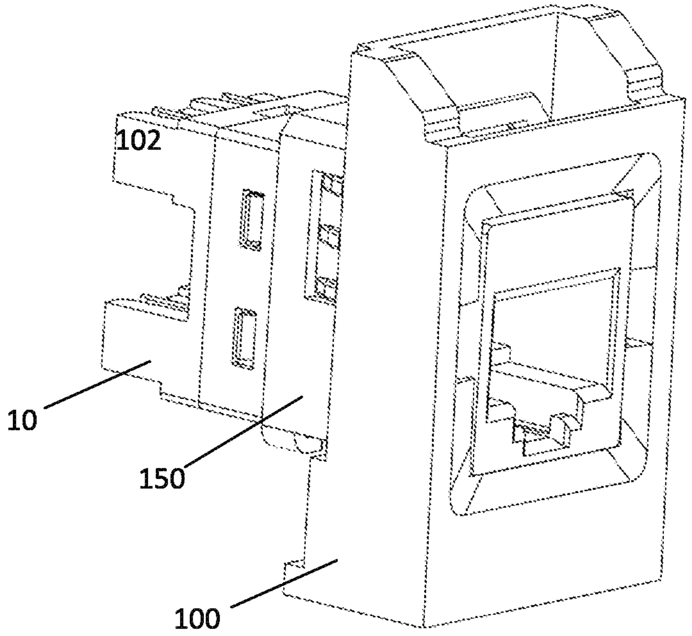
FIG. 11 is a front perspective view of an assembly including a first jack type secured to the opening structure of FIG. 1.
Figure 12:
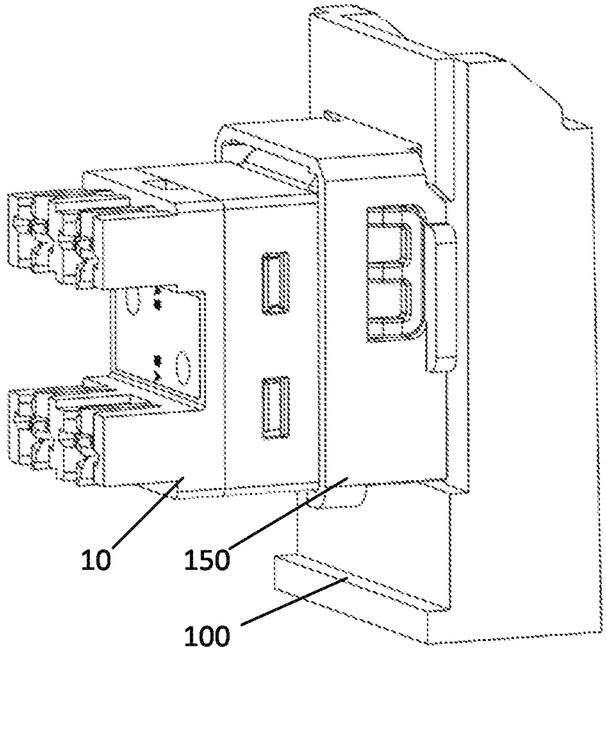
FIG. 12 is a rear perspective view of the assembly shown in FIG. 11.
Figure 13:
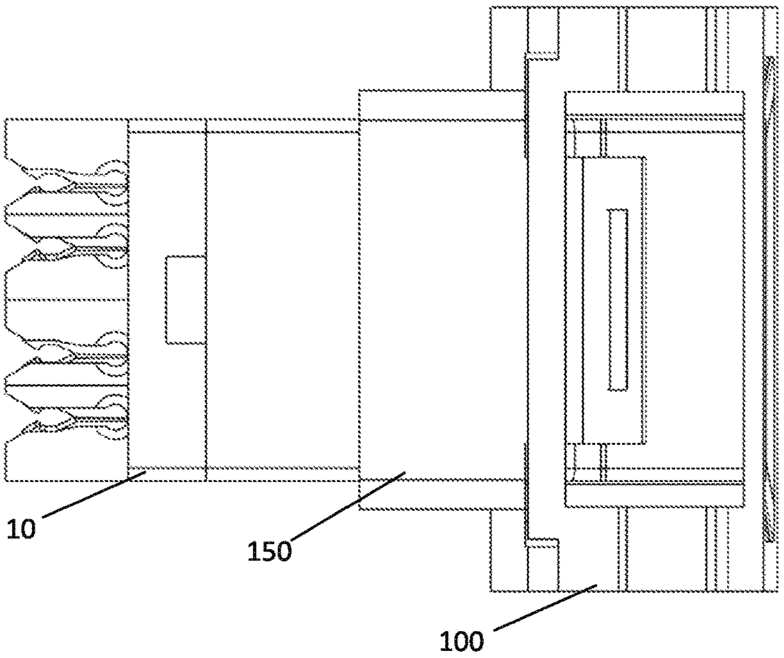
FIG. 13 is a top view of the assembly shown in FIG. 11.
Figure 14:
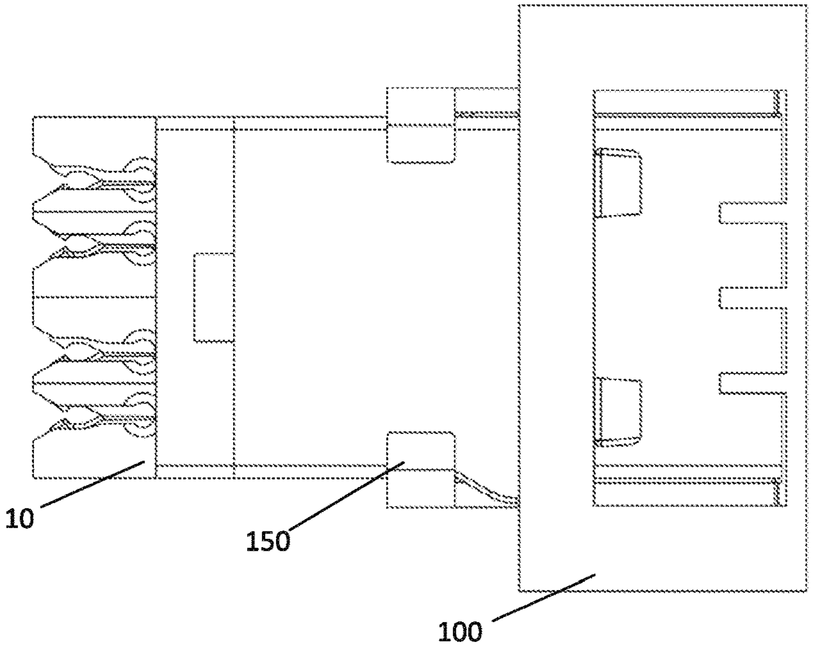
FIG. 14 is a bottom view of the assembly shown in FIG. 11.
Figure 15:
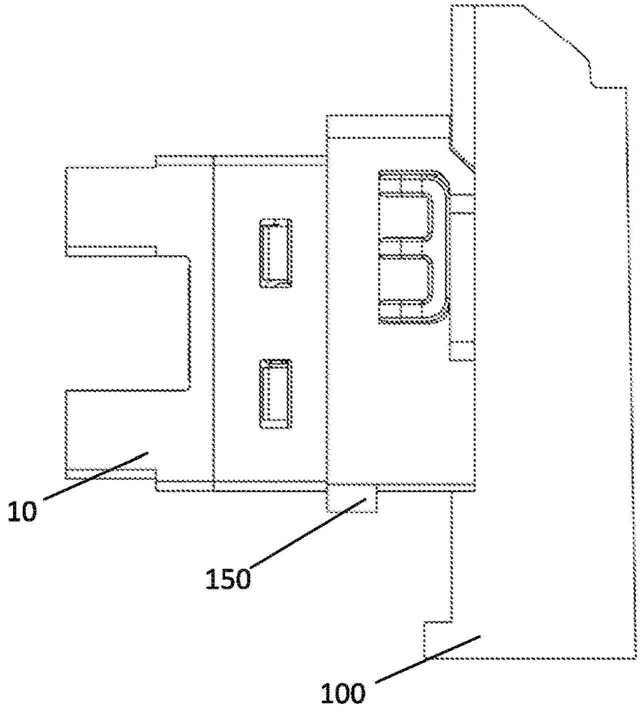
FIG. 15 is a side view of the assembly shown in FIG. 11.
Figure 16:
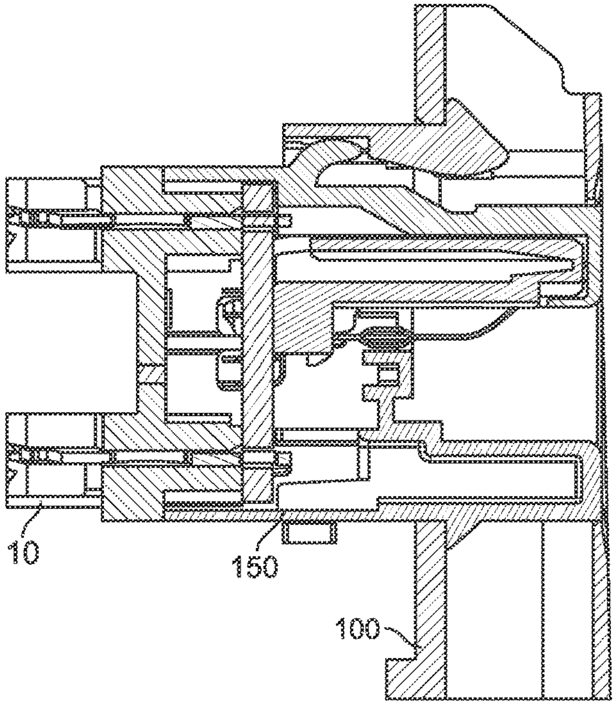
FIG. 16 is a cross-sectional side view of the assembly shown in FIG. 11.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Opening Structure 100

Referring to FIGS. 1 to 10, and opening structure 100 is presented. The opening structure 100 is configured such that various types of jacks can be received, for example jacks 20, 30, 40. Accordingly, the opening structure 100 eliminates the need for separate opening structures for each type of jack.

As shown, the opening structure 100 includes a main body 102 defining a pair of side walls 104, 106 defining side surfaces 104*a*, 106*a*. A front wall 108 extends between the side walls 104, 106 and includes a central opening 110 defined by an inner perimeter edge 110*a*. An upper rear wall 112 and a lower rear wall 114 also extend between the side walls 104, 106 and together form a central opening 116. Together, the central openings 110, 116 can be referred to as defining a central opening or passageway 118. The main body also includes a plurality of walls or ribs 120 that, in the example shown, extend from the front wall 108. The walls or ribs 120 define upper surfaces 112*a* for supporting a jack 10, 20, 30 within the passageway 118.

In one aspect, the opening structure 100 defines a first attachment arrangement 170 such that an SL style jack can be received within the passageway 118 and secured to the opening structure 100. As shown, the first attachment arrangement 170 is defined by a first edge 112*a* and a second edge 114*a* opposing the first edge 112*a* separated by the height H2. In the particular example shown, the first edge 112*a* is defined by the lower edge 112*a* of the upper rear wall 112 and the second edge 114*a* is defined by the upper edge 114*a* of the lower rear wall 114. As configured, the edges 112*a*, 114*a* can be received by the latch members 24, 26 of the jack 20, as is shown in detail at FIGS. 18 to 24. Once installed in such a manner, a front portion 20*a* of the jack 20 main body extends at least partially into the opening 110 of the front wall 108 such that the front portion is supported by the surfaces 112*a* of the ribs 112 and the inner edge 108*a* of the front wall 108.

In one aspect, the opening structure 100 defines a second attachment arrangement 180 such that an M style jack can be received within the passageway 118 and secured to the opening structure 100. As shown, the second attachment arrangement 180 is defined by a first recess 104*b* and a catch surface 104*c* defined within the side wall 104 and an opposing recess 106*b* and catch surface 106*c* defined within the side wall 106. In one aspect, the first and second recesses 104*b*, 106*b* extend through the front face 108*b* of the front wall 108 and terminate at the catch surfaces 104*c*, 106*c*, which are generally parallel to the front face 108*b*. As configured, the recesses 104*b*, 106*b* receive the latch members 34 of the jack 30, as is shown in detail at FIGS. 25 to 30. Once installed in such a manner, the jack 30 main body extends into the passageway 118 such that a front portion 30*a* of the jack 30 abuts a rear face 108*c* of the front wall 108 and such that the front portion 30*a* is supported by the surfaces 112*a* of the ribs 112. The jack 30 is prevented from further insertion into the opening structure 100 by contact between the side stops 36 and rear faces 104*d*, 106*d* of the side walls 104, 106. Accordingly, the rear faces 104*d*, 106*d* can also be characterized as forming part of the attachment arrangement 180.

Figure 17:
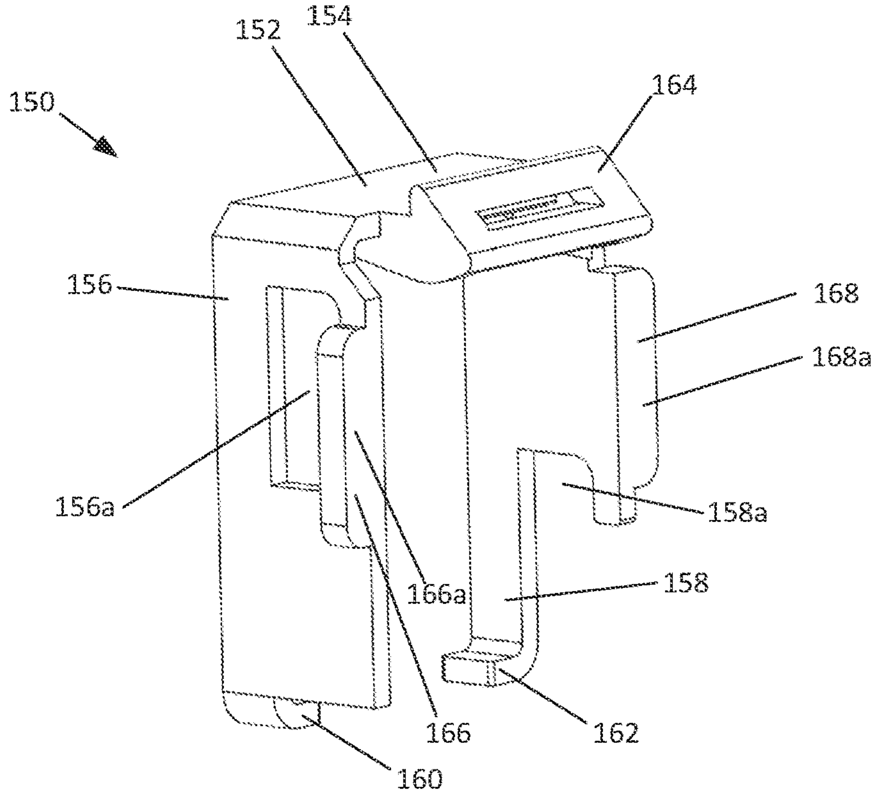
FIG. 17 is a front perspective view of an adapter usable with the assembly shown in FIG. 11.
Figure 18:
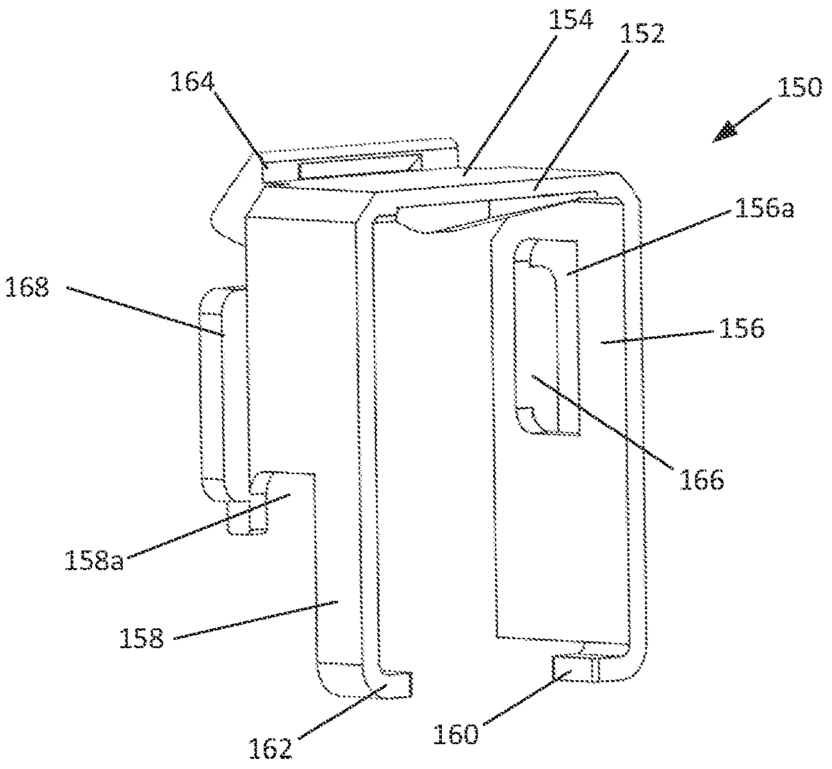
FIG. 18 is a rear perspective view of the adapter shown in FIG. 17.

In one aspect, and with reference to FIGS. 17 to 18, an adapter 150 can be used to enable a KJ style jack 10 to be connected to the opening structure 100 via the first attachment arrangement 170. As shown, the adapter 150 includes a main body 152 that defines a top wall 154, a pair of side walls 156, 158 extending from the top wall 154, a pair of bottom walls 160, 162 extending from the side walls 156, 158. The sidewalls are provided with openings 156*a*, 158*a* for receiving the side stops 18 of the jack 10. In the example shown, the openings 156*a*, 156*b* are axially offset such that the opening 156*a* is closer to the top wall 154 than is the opening 158*a* so as to match the locations of the side stops 18 on the jack 10. In the example shown, the opening 158*a* is a fully enclosed opening while the opening 158*a* is formed as an open recess within the sidewall 158. As a result of these features, the adapter 150 does not have mirror symmetry along any axis and thus can also be characterized as having one order of rotational symmetry.

With this disclosed shape, the main body 152 can be snapped onto to the jack 10. The adapter 150 is also provided with a deflectable latch 164 extending from the top wall 154 and a pair of side stops 166, 168 respectively extending from the pair of sidewalls 156, 158. In one aspect, the adapter 150 increases the height of the jack 10 such that the jack 10, with the adapter 150 installed, can be mounted into an opening structure 100 having an opening height H2. This is accomplished by the deflectable latch 164 of the adapter engaging with the front face 112*a* of the wall 112 and by the fixed latch member 16 of the jack engaging with the front face 114*a* of the wall 114. Front surfaces 166*a*, 168*a* of the forward-shifted side stops 166, 168 also engage or abut the rear surfaces 104*b*, 106*b* of the side walls 104, 106, with the edges 120*a* of the ribs 120 supporting the jack 10, as previously described.

Figure 17A:
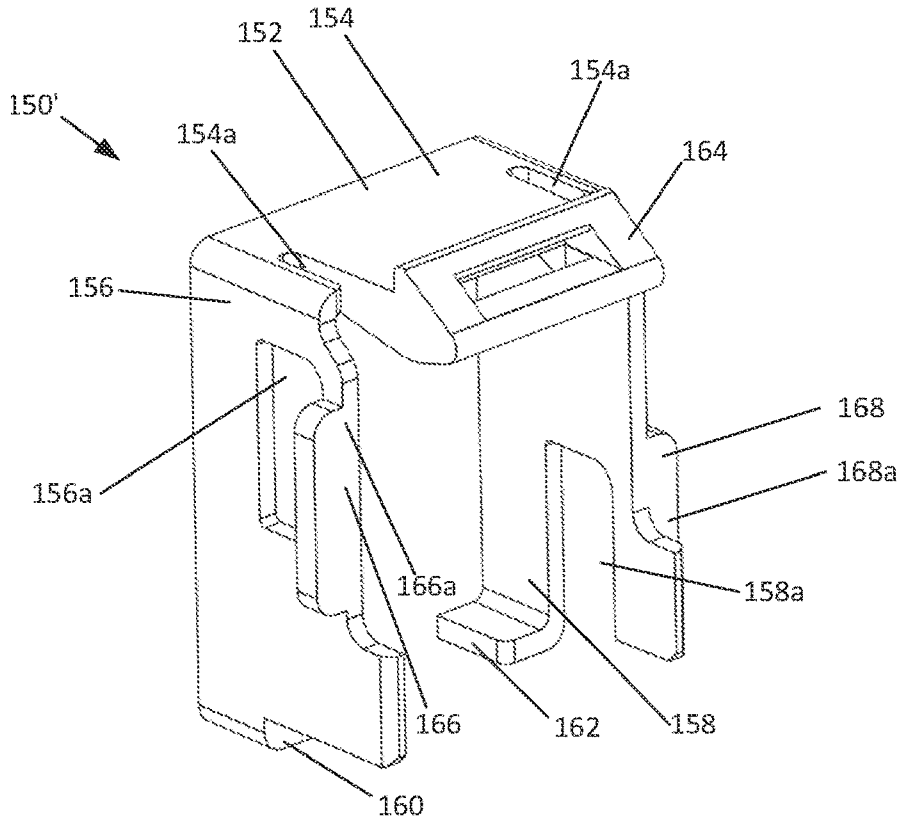
FIG. 17A is a front perspective view of an adapter usable with the assembly shown in FIG. 11.
Figure 18A:
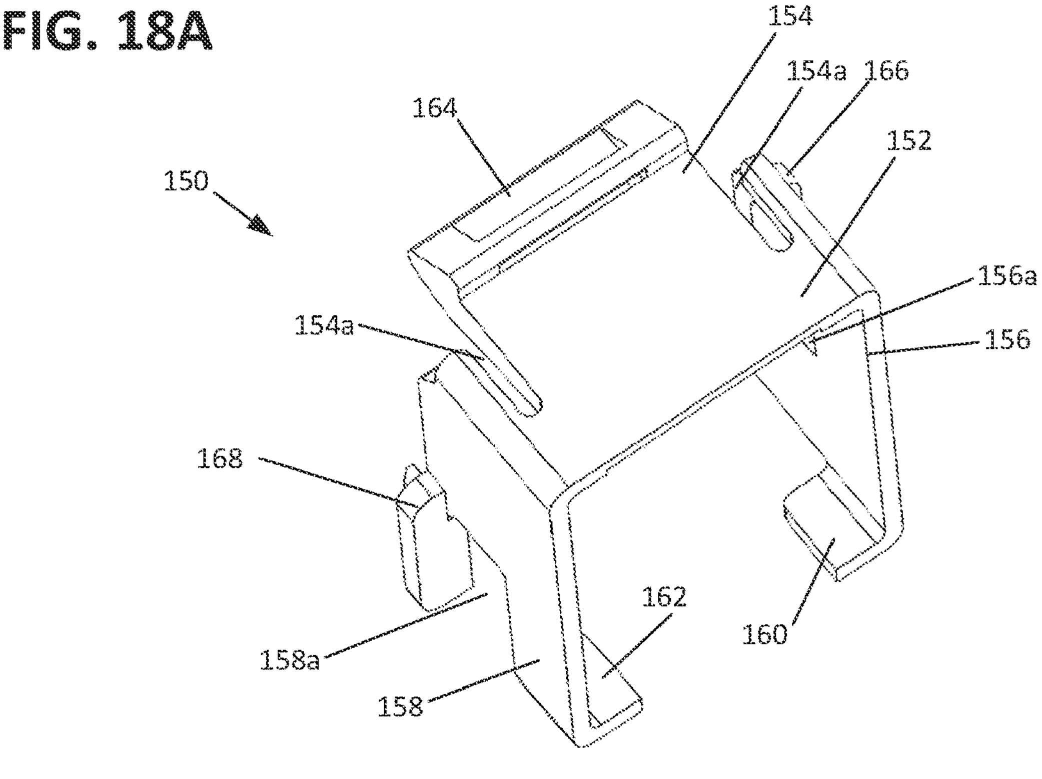
FIG. 18A is a rear perspective view of the adapter shown in FIG. 17A.
Figure 19:
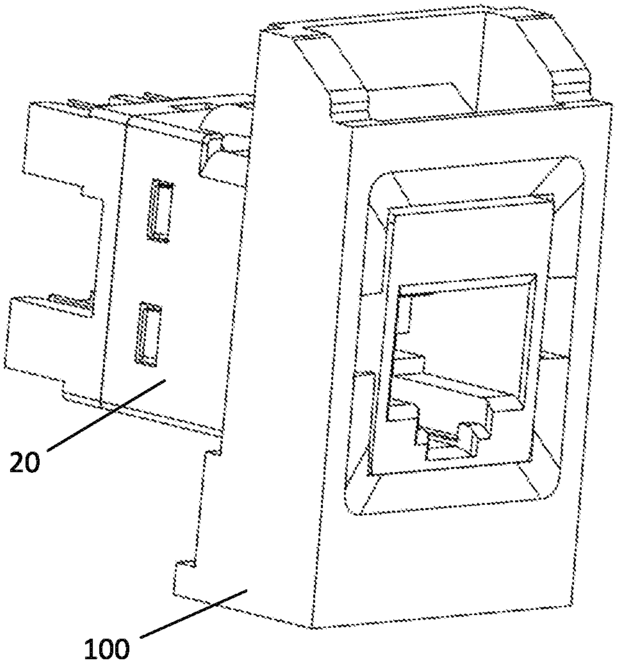
FIG. 19 is a front perspective view of an assembly including a second jack type secured to the opening structure of FIG. 1.
Figure 20:
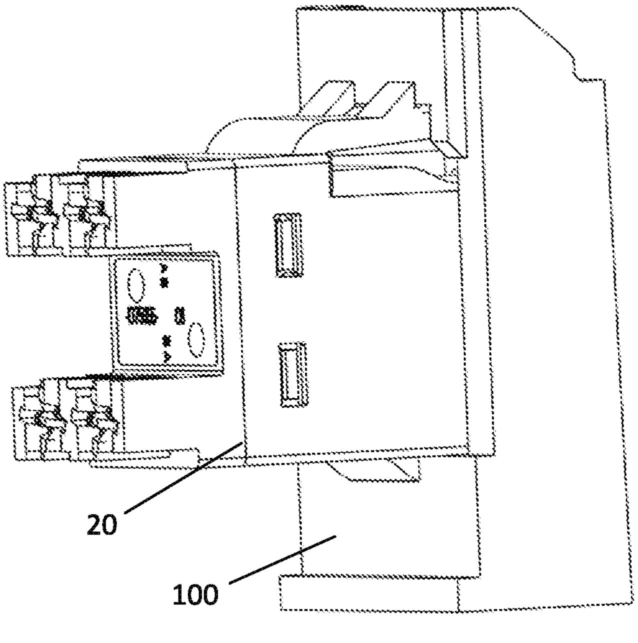
FIG. 20 is a rear perspective view of the assembly shown in FIG. 19.
Figure 21:
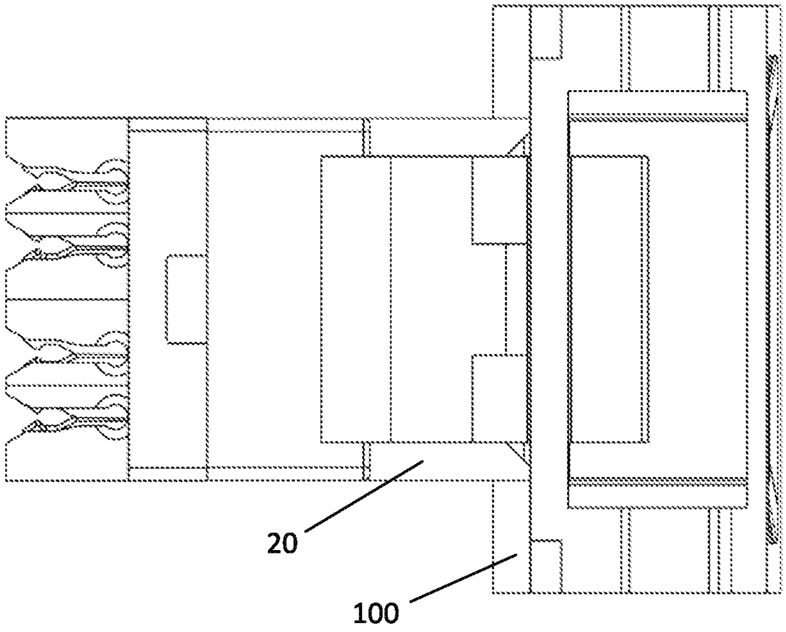
FIG. 21 is a top view of the assembly shown in FIG. 19.
Figure 22:
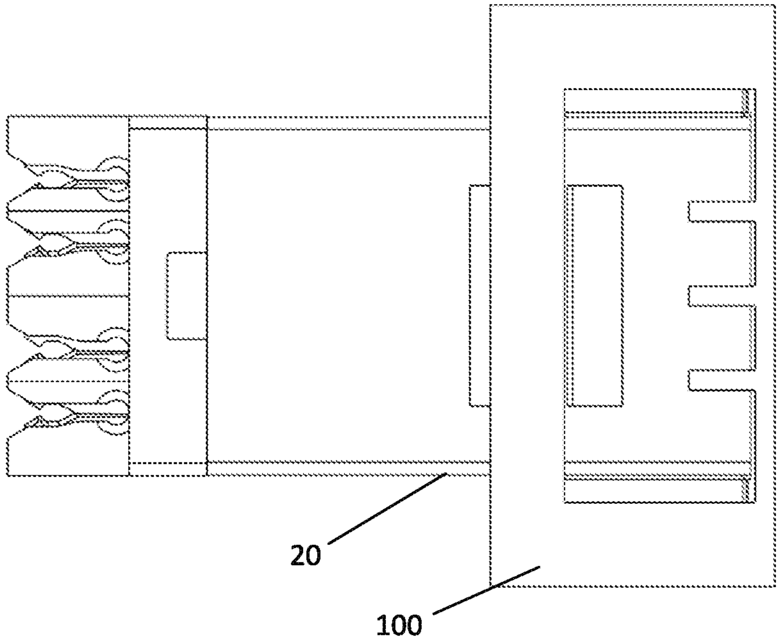
FIG. 22 is a bottom view of the assembly shown in FIG. 19.
Figure 23:
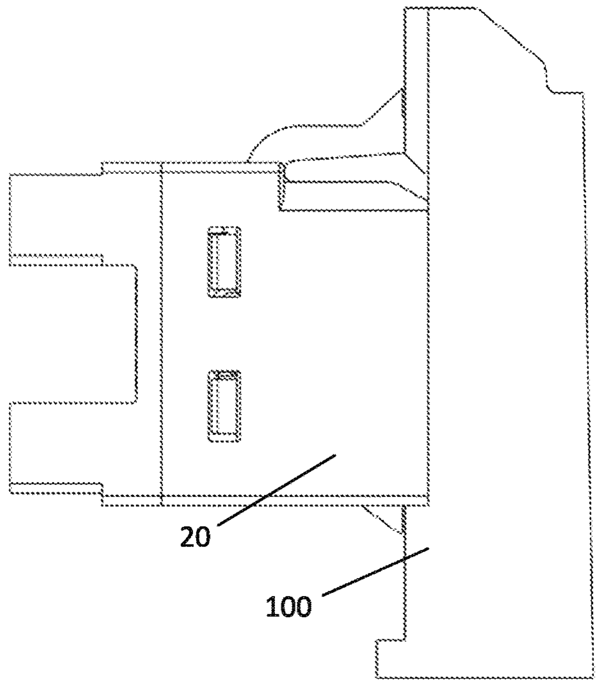
FIG. 23 is a side view of the assembly shown in FIG. 19.
Figure 24:
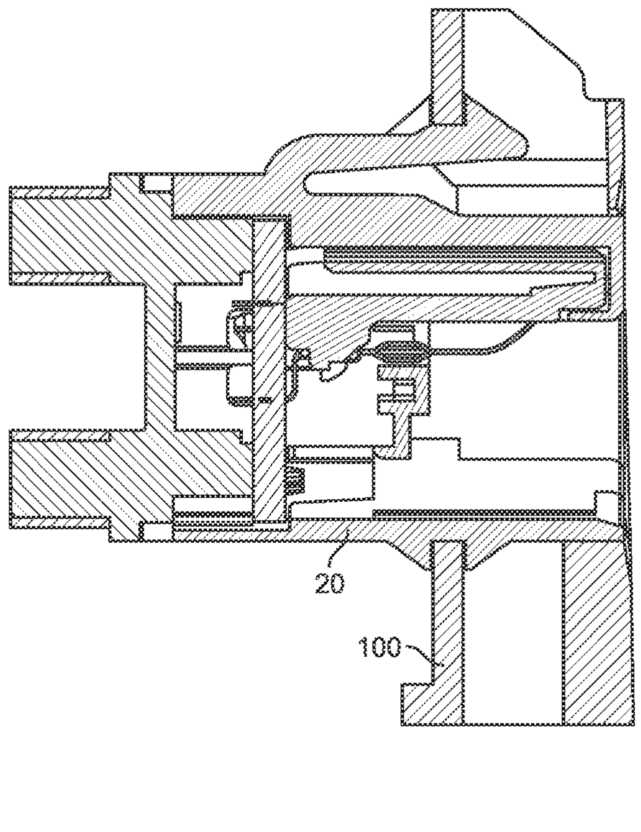
FIG. 24 is a cross-sectional side view of the assembly shown in FIG. 19.
Figure 25:
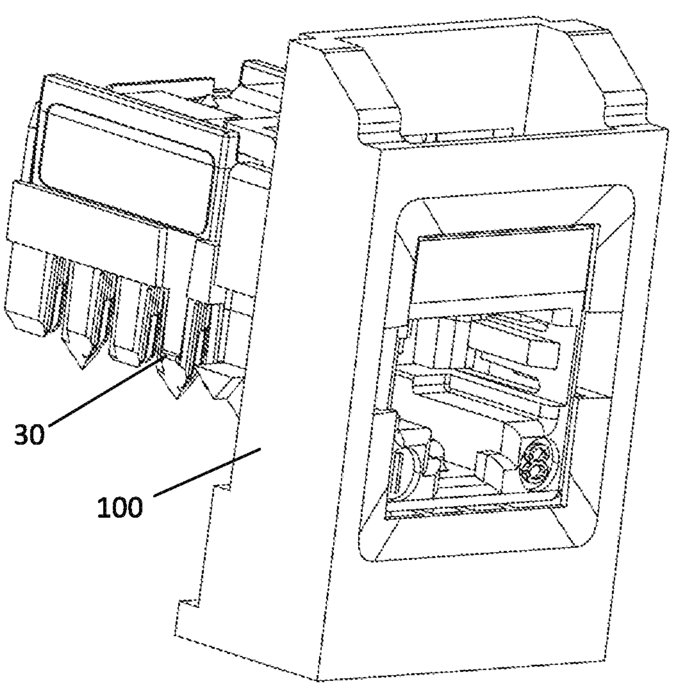
FIG. 25 is a front perspective view of an assembly including a third jack type secured to the opening structure of FIG. 1.
Figure 26:
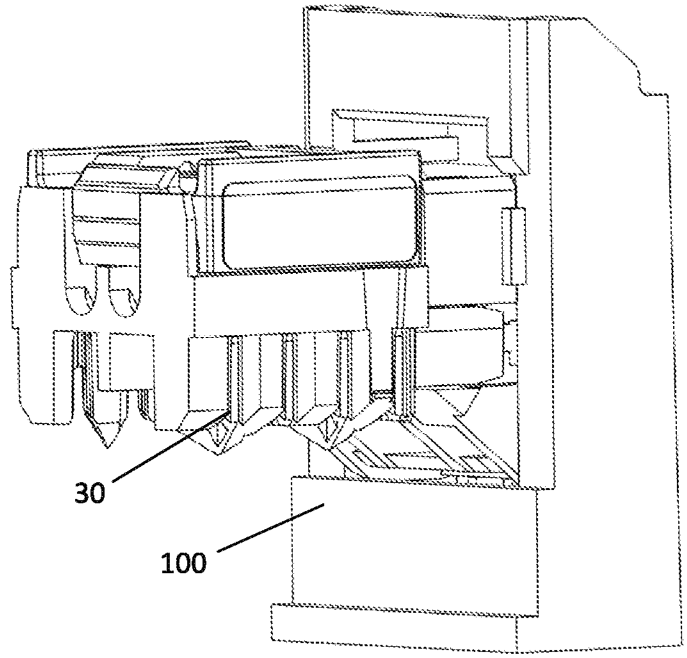
FIG. 26 is a rear perspective view of the assembly shown in FIG. 25.
Figure 27:
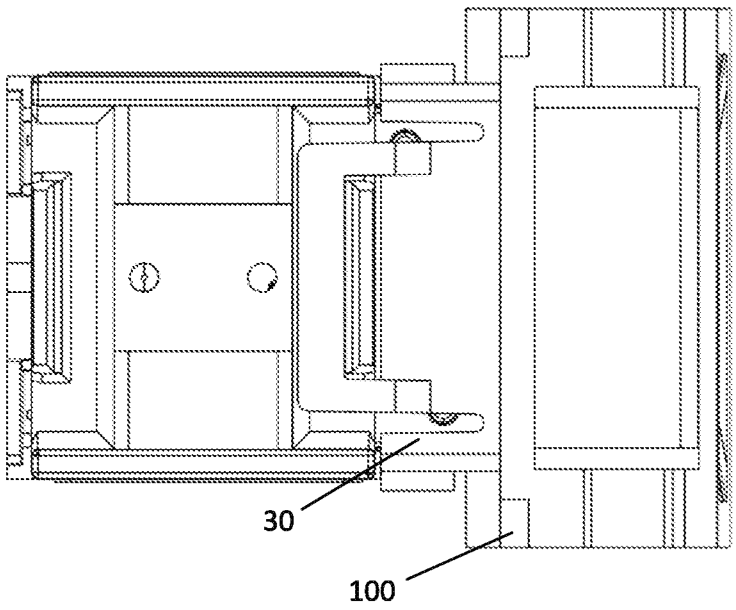
FIG. 27 is a top view of the assembly shown in FIG. 25.
Figure 28:
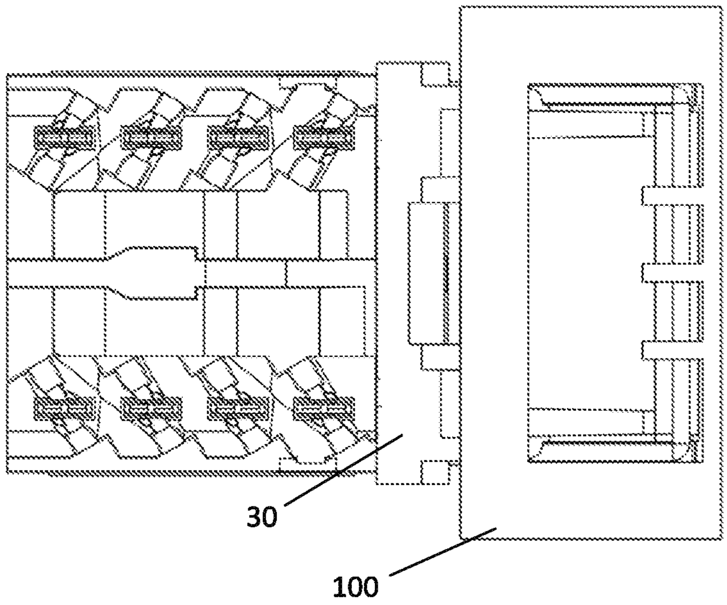
FIG. 28 is a bottom view of the assembly shown in FIG. 25.
Figure 29:
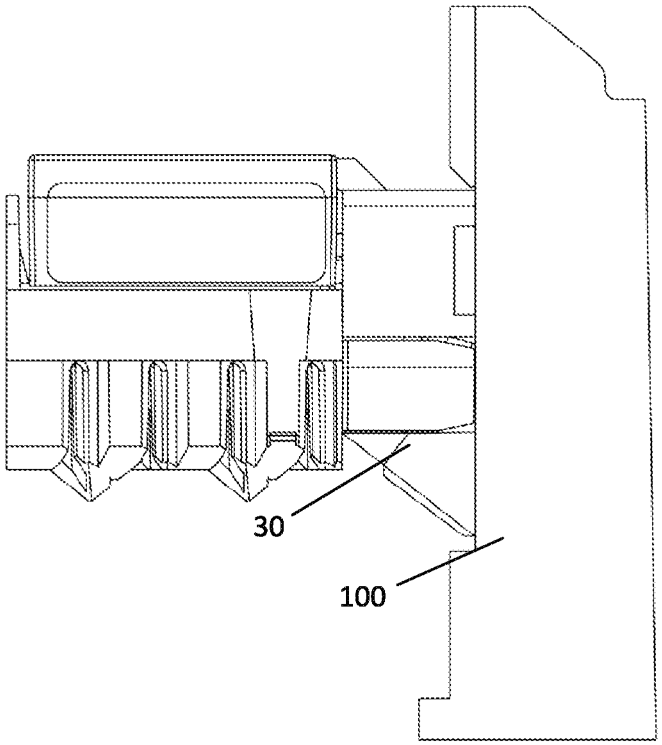
FIG. 29 is a side view of the assembly shown in FIG. 25.
Figure 30:
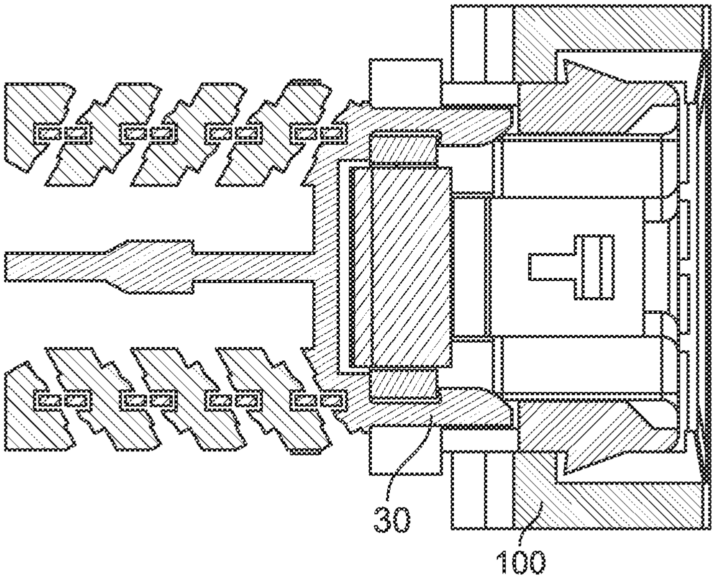
FIG. 30 is a cross-sectional top view of the assembly shown in FIG. 25.
Figure 31:
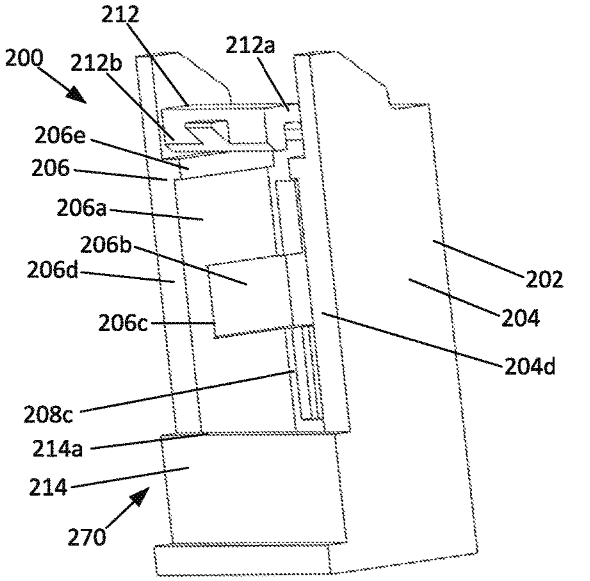
FIG. 31 is a rear top perspective view of a second opening structure having features in accordance with the present disclosure.
Figure 32:
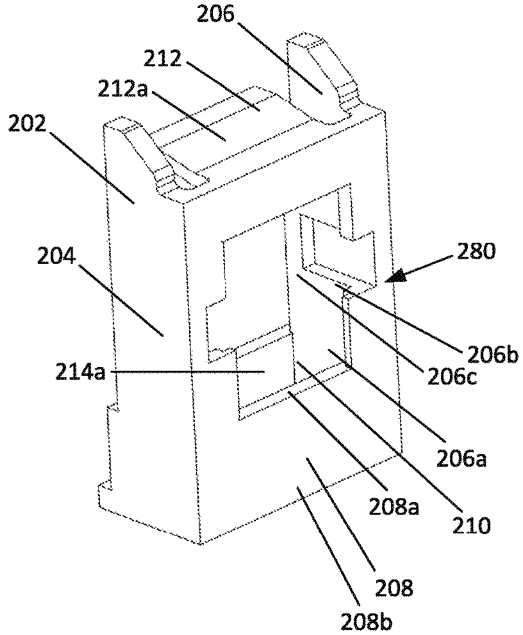
FIG. 32 is a front top perspective view of the opening structure of FIG. 31.
Figure 33:
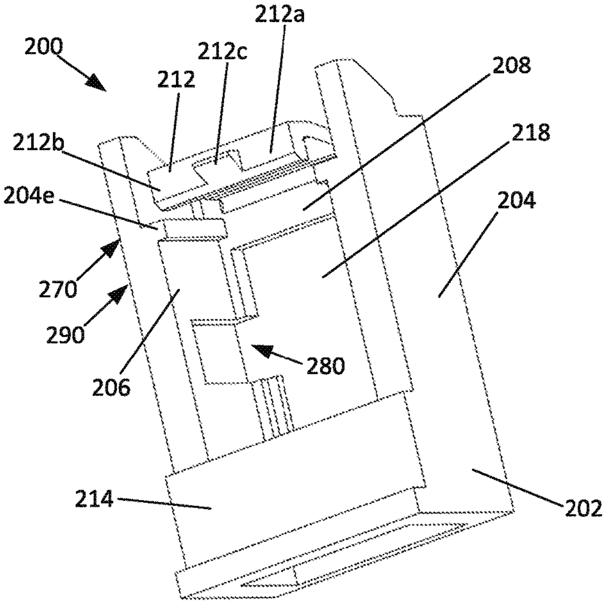
FIG. 33 is a rear bottom perspective view of the opening structure of FIG. 31.
Figure 34:
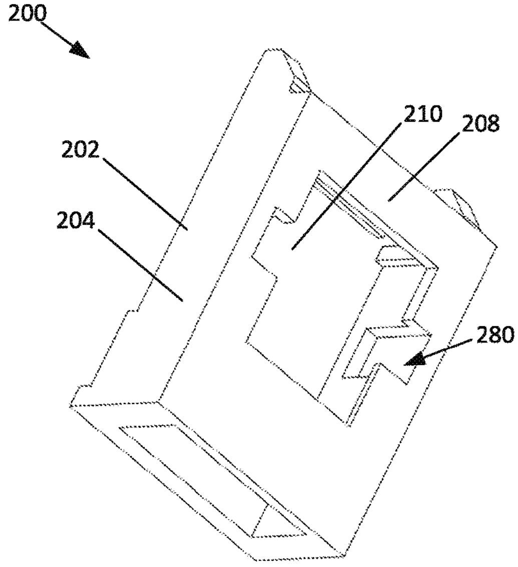
FIG. 34 is a front bottom perspective view of the opening structure of FIG. 31.
Figure 35:
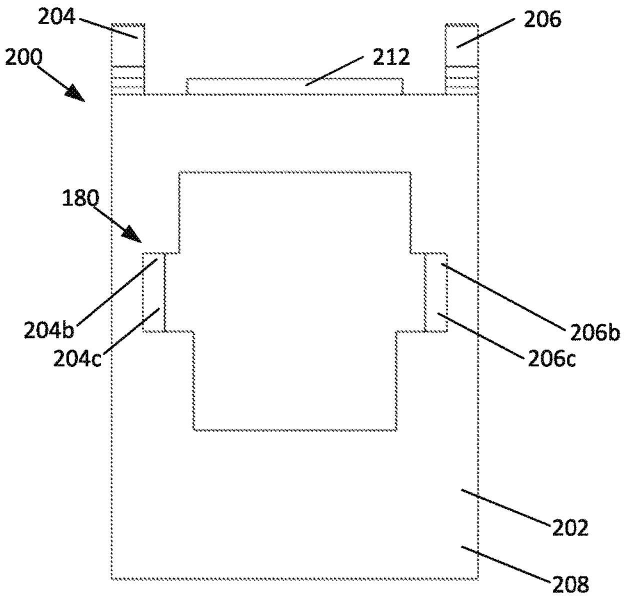
FIG. 35 is a front view of the opening structure of FIG. 31.
Figure 36:
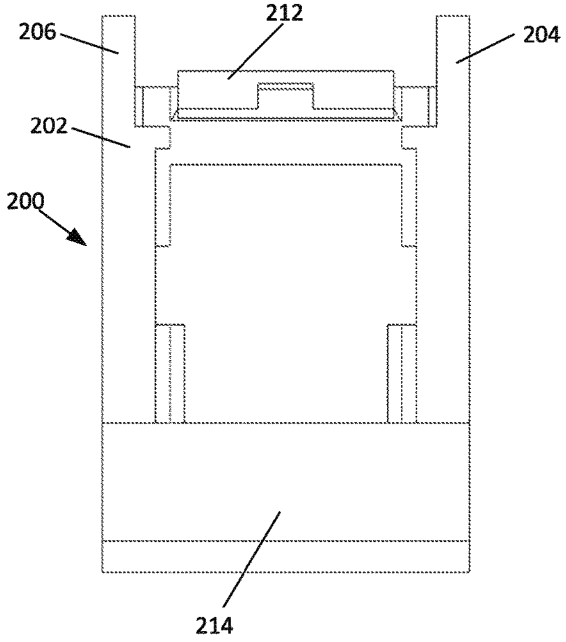
FIG. 36 is a rear view of the opening structure of FIG. 31.
Figure 37:
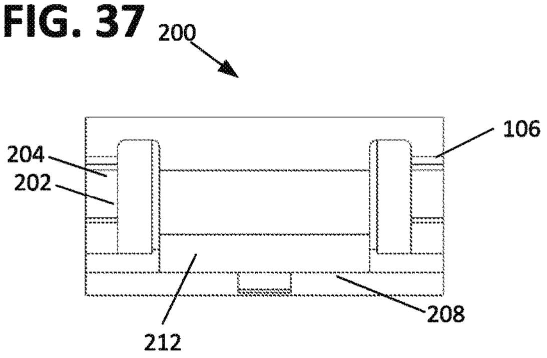
FIG. 37 is a top view of the opening structure of FIG. 31.
Figure 38:
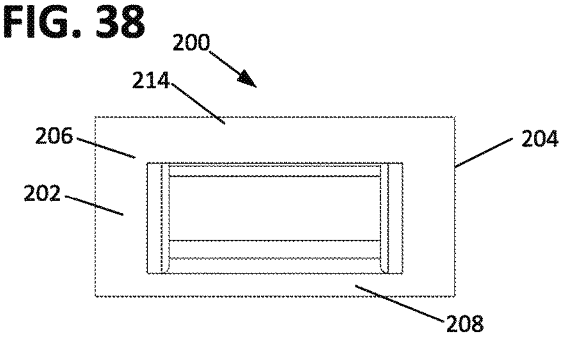
FIG. 38 is a bottom view of the opening structure of FIG. 31.
Figure 39:
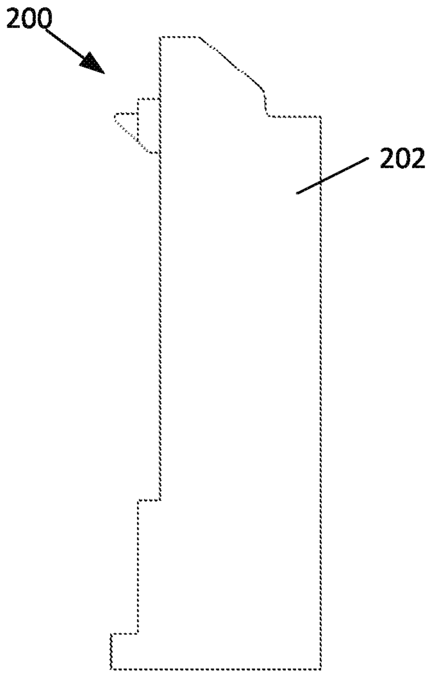
FIG. 39 is a side view of the opening structure of FIG. 31.
Figure 40:
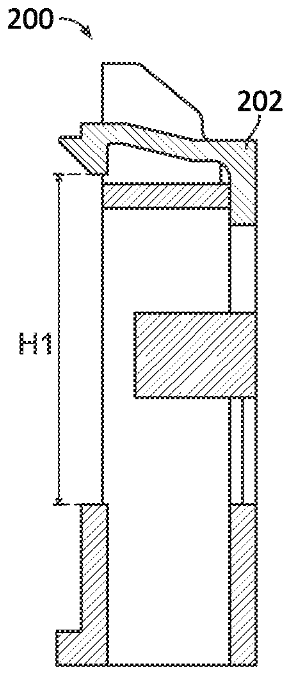
FIG. 40 is a cross-sectional side view of the opening structure of FIG. 31.
Figure 41:
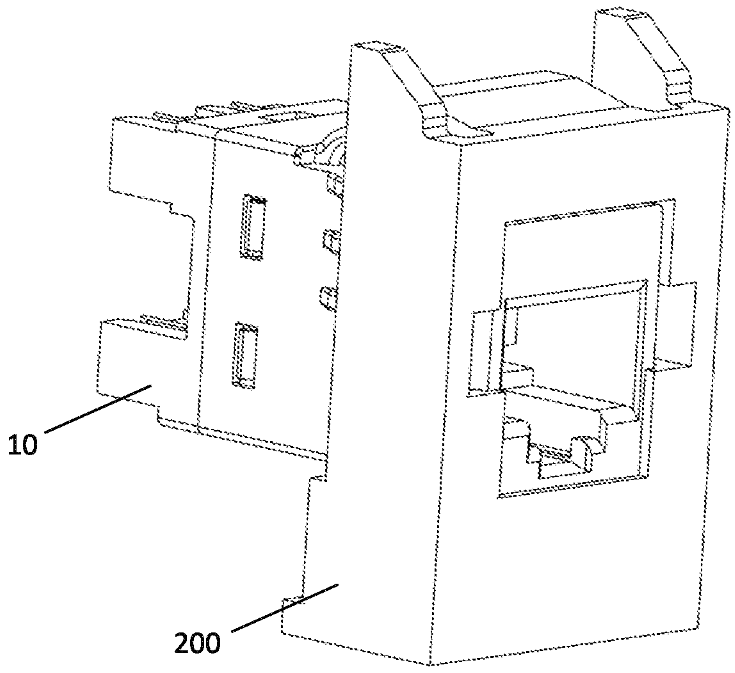
FIG. 41 is a front perspective view of an assembly including a first jack type secured to the opening structure of FIG. 31.
Figure 42:
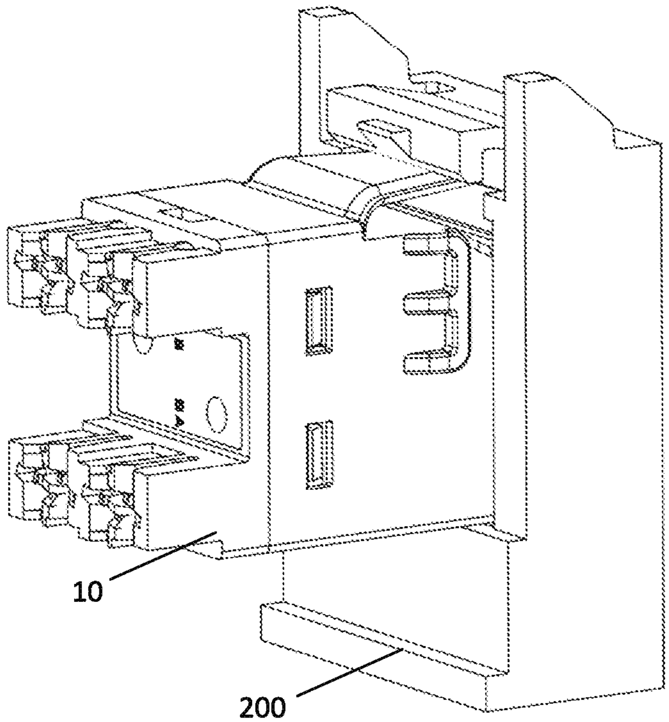
FIG. 42 is a rear perspective view of the assembly shown in FIG. 41.
Figure 43:
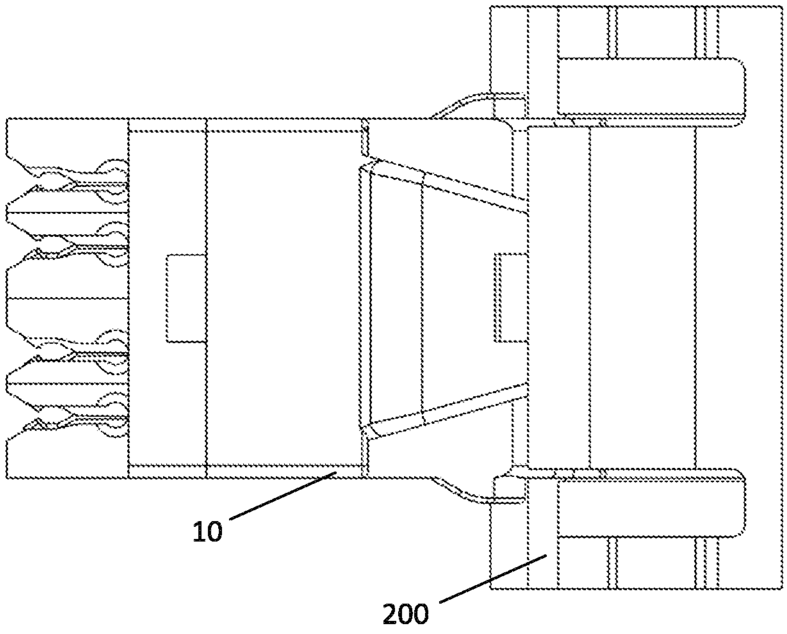
FIG. 43 is a top view of the assembly shown in FIG. 41.
Figure 44:
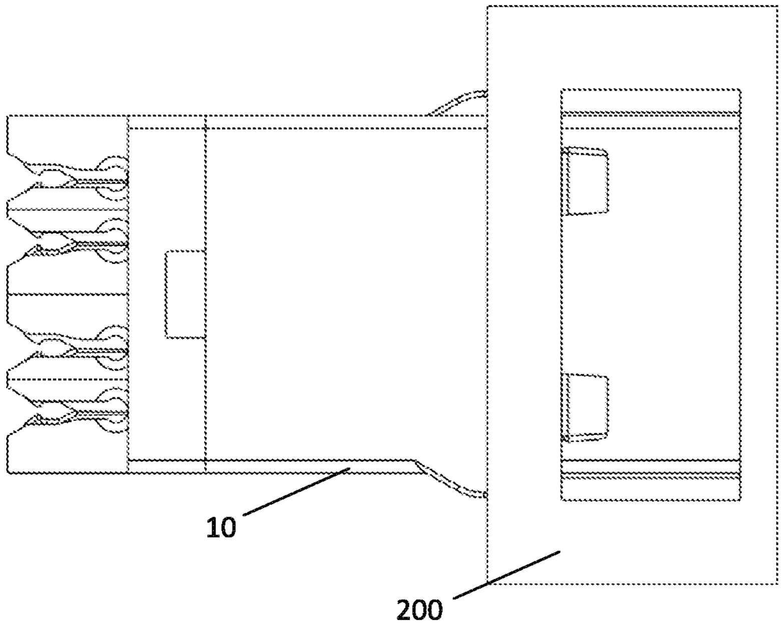
FIG. 44 is a bottom view of the assembly shown in FIG. 41.
Figure 45:
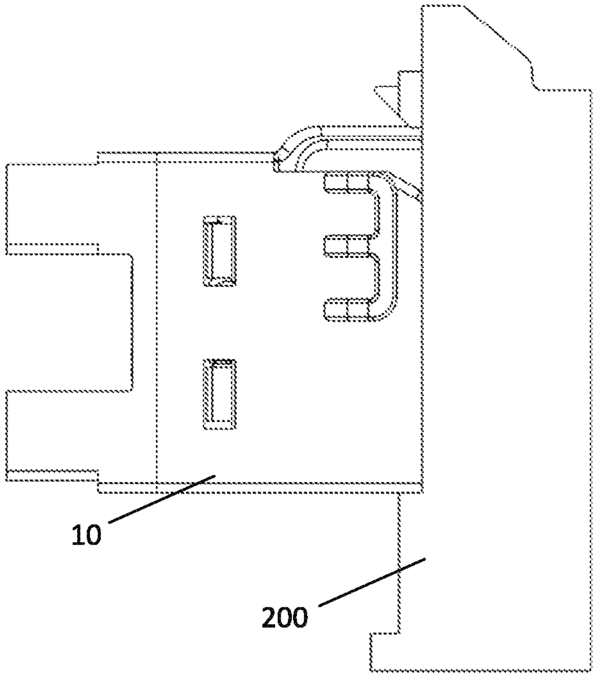
FIG. 45 is a side view of the assembly shown in FIG. 41.
Figure 46:
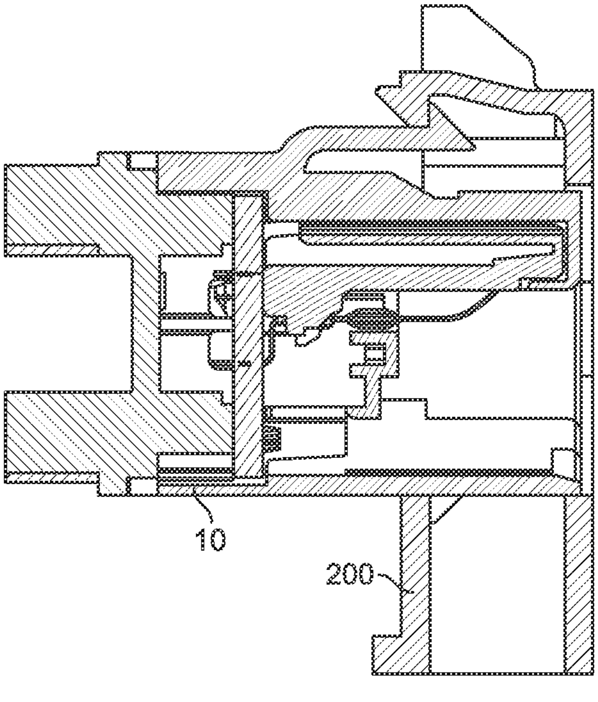
FIG. 46 is a cross-sectional side view of the assembly shown in FIG. 41.
Figure 47:
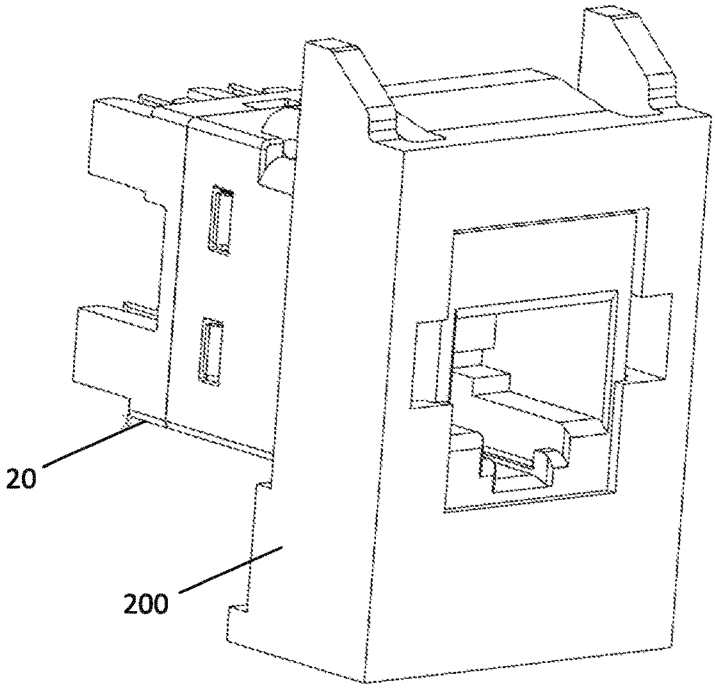
FIG. 47 is a front perspective view of an assembly including a second jack type secured to the opening structure of FIG. 31.
Figure 48:
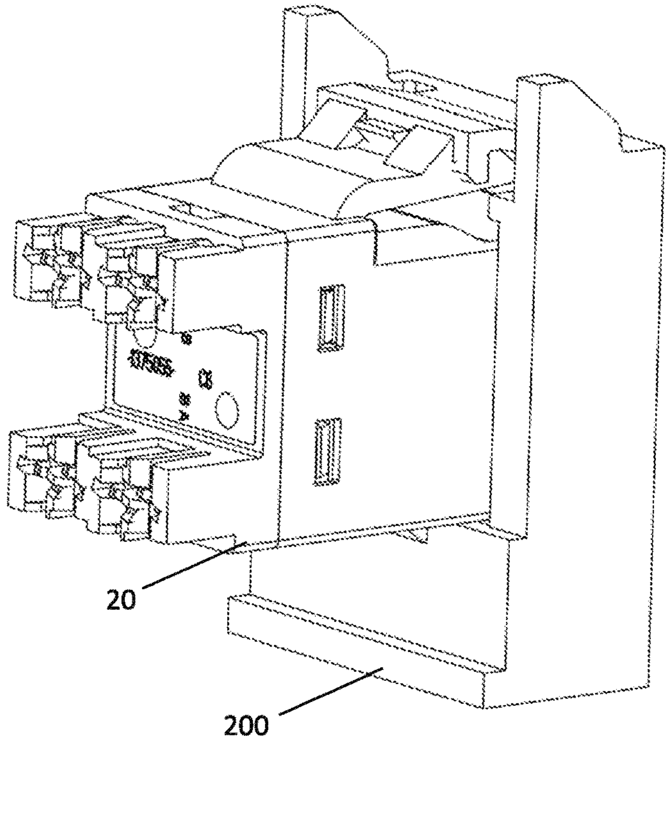
FIG. 48 is a rear perspective view of the assembly shown in FIG. 47.
Figure 49:
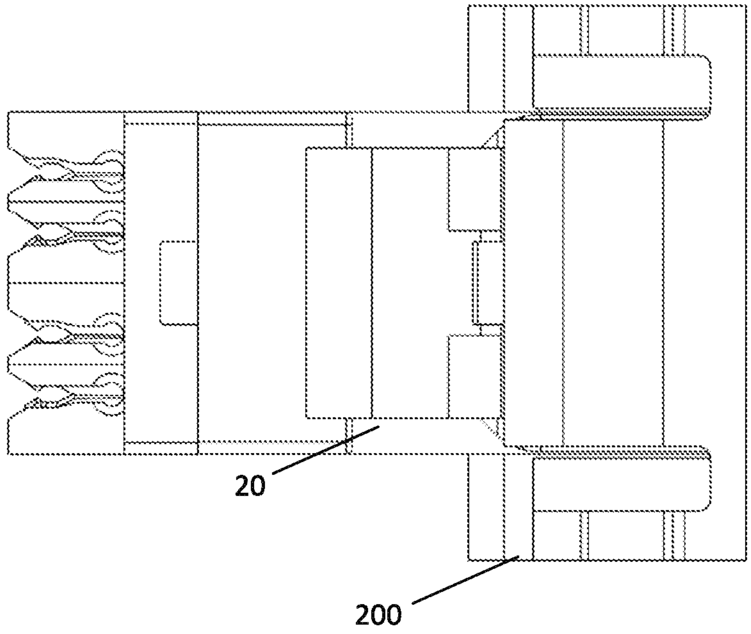
FIG. 49 is a top view of the assembly shown in FIG. 47.
Figure 50:
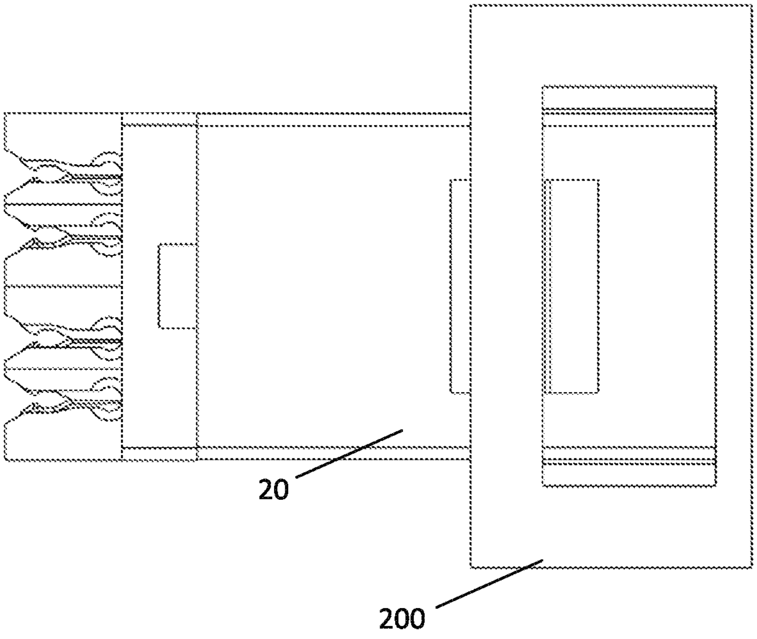
FIG. 50 is a bottom view of the assembly shown in FIG. 47.
Figure 51:
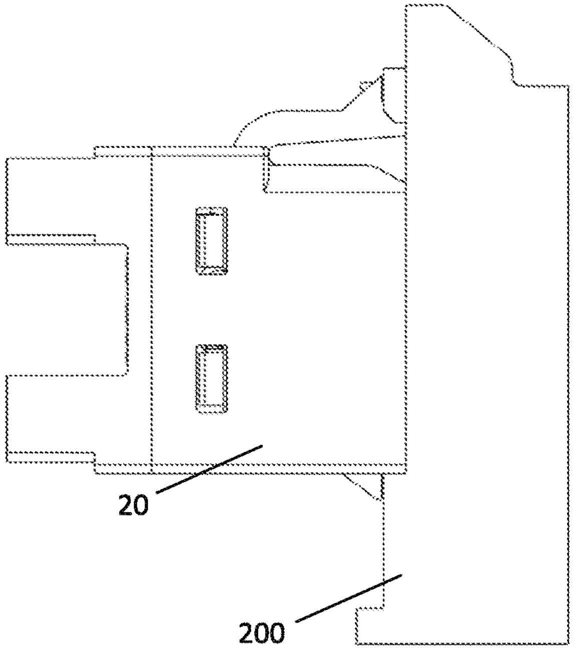
FIG. 51 is a side view of the assembly shown in FIG. 47.
Figure 52:
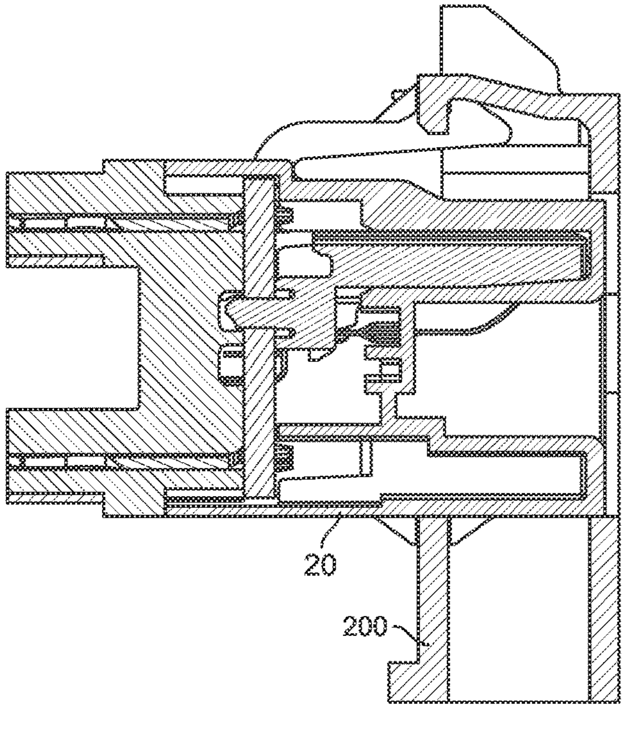
FIG. 52 is a cross-sectional side view of the assembly shown in FIG. 47.
Figure 53:
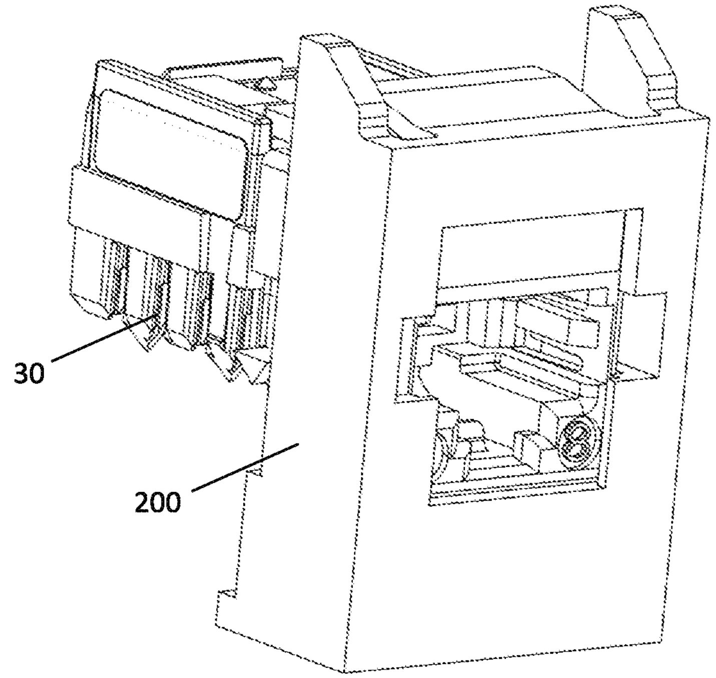
FIG. 53 is a front perspective view of an assembly including a third jack type secured to the opening structure of FIG. 31.
Figure 54:
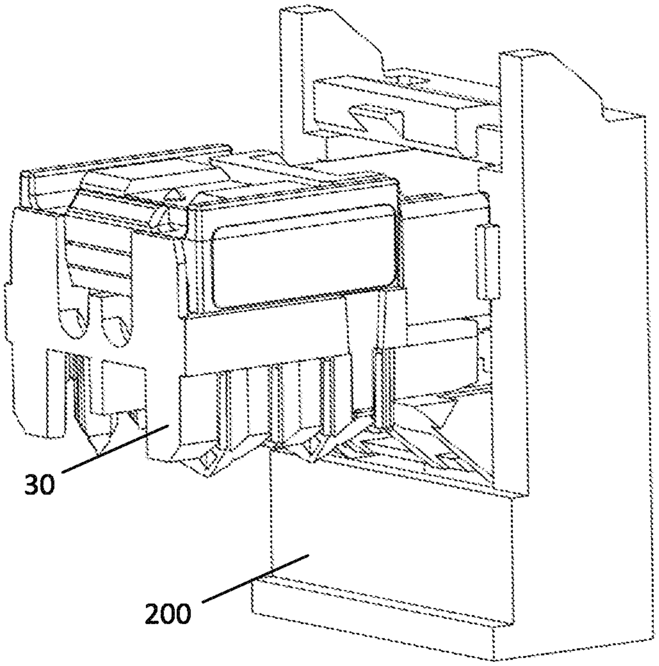
FIG. 54 is a rear perspective view of the assembly shown in FIG. 53.
Figure 55:
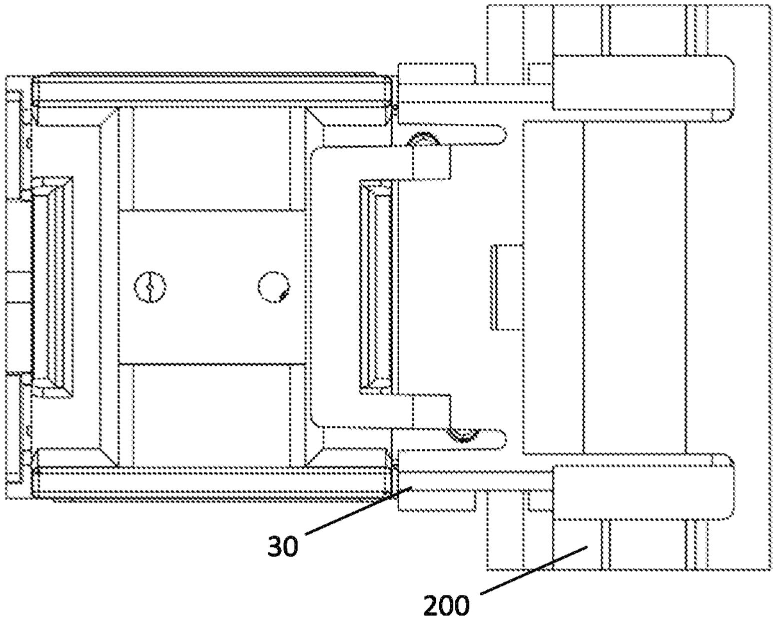
FIG. 55 is a top view of the assembly shown in FIG. 53.
Figure 56:
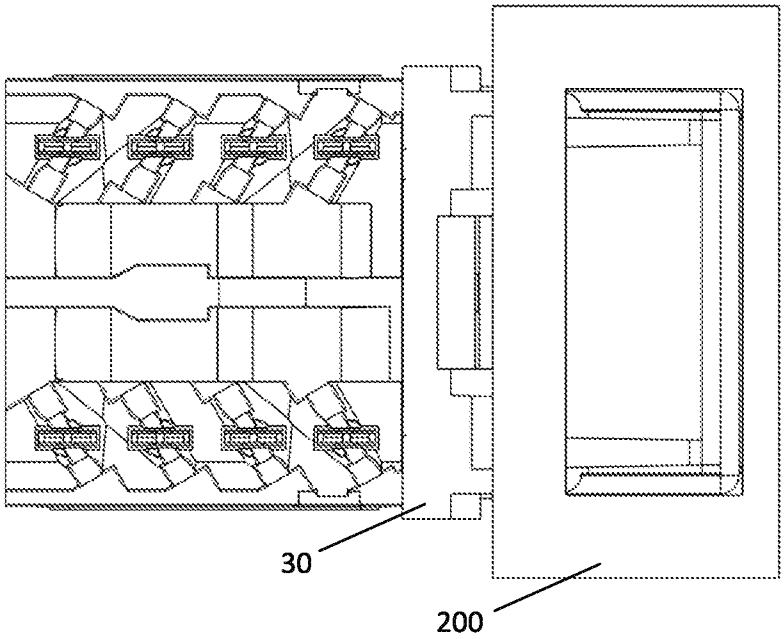
FIG. 56 is a bottom view of the assembly shown in FIG. 53.
Figure 57:
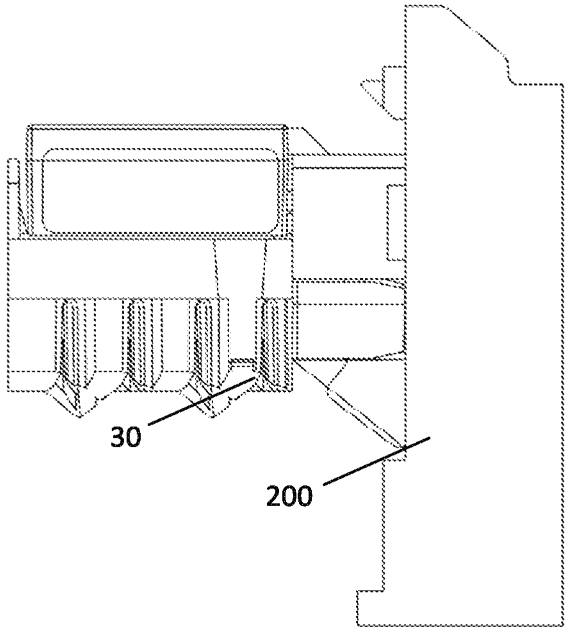
FIG. 57 is a side view of the assembly shown in FIG. 53.
Figure 58:
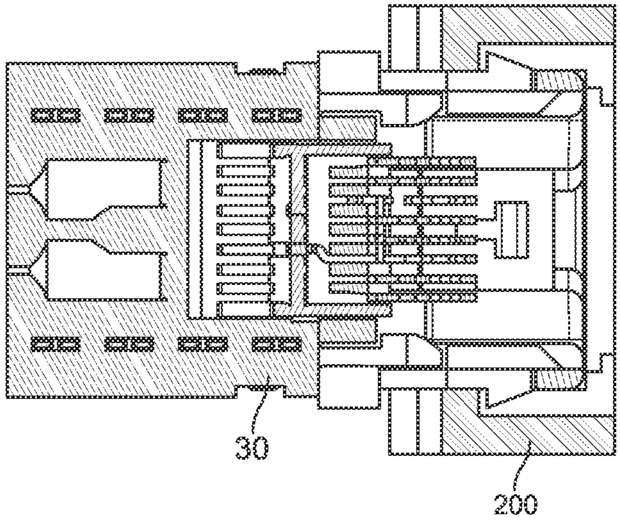
FIG. 58 is a cross-sectional top view of the assembly shown in FIG. 53.
Figure 59:
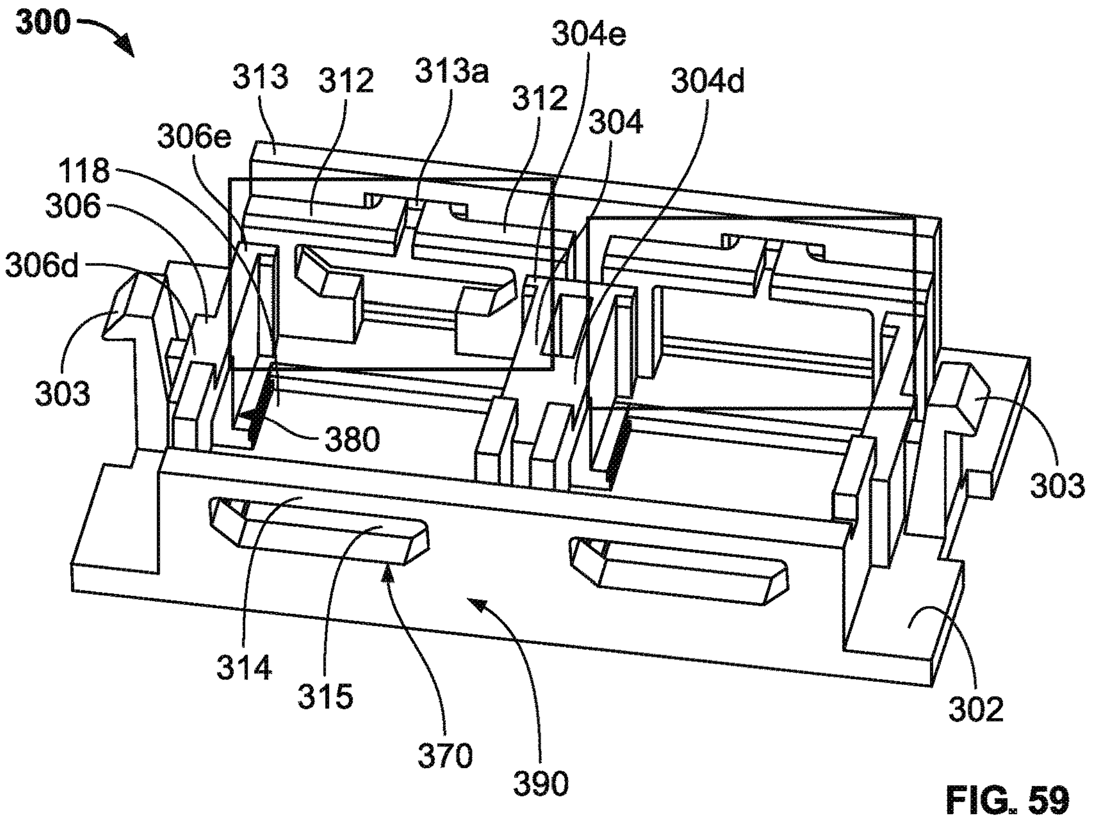
FIG. 59 is a rear perspective view of a third opening structure having features in accordance with the present disclosure.

Referring to FIGS. 17A and 18A, an adapter 150' is presented which is a variation of the adapter 150 shown in FIGS. 17 and 18. Many of the features of adapter 150' are the same as previously shown and described for adapter 150 and are thus applicable for adapter 150'. Adapter 150' differs from adapter 150 in several ways. For example, adapter 150' is provided with additional slots 154*a* extending in the top wall 154 on each side of the deflectable latch 164. By providing slots 154*a* in this fashion, the latch 164 provided with a greater cantilevered length and is therefore more flexible and more easily deflectable. The adapter 150' is also provided with side stops 166, 168 that are not directly opposite from each other as is the case with adapter 150 and are instead located at different axial distances from the top wall 154. As shown, the side stop 166 is located as shown for adapter 150 while the side stop 168 is located further away from the top wall 154 and closer to the bottom wall 162. The sidewalls 156, 158 of the adapter 150' are also modified from adapter 150. For example, the sidewalls 156, 158 of adapter 150' are wider and provided with portions that extend beyond the front surfaces 166*a*, 168*a* of the side stops 166, 168 and provide further engagement with the sidewalls of the jack 10. This construction also results in the opening 158*a* being more fully defined as an elongate channel in comparison to the opening 158*a* formed on adapter 150.

Although a single opening structure 100 is defined by the main body 102, any number of opening structures 100 may be provided in single or multiple rows and/or single or multiple columns in a one or two dimensional array. Additionally, one or more opening structures 100 may be integrally formed with a wall plate or panel structure having additional features.

Opening Structure 200

Referring to FIGS. 31 to 58, a second example of an opening structure 200 is presented. The opening structure 200 is generally similar to the openings structure 100 and shares many features in common. Where such features are generally the same, similar reference numbers are used, but using 200-series numbers instead of 100-series numbers. Where features are generally similar, the description already presented for the opening structure 100 is applicable to opening structure 200 and need not be repeated in this section. Accordingly, this section is generally limited to the differences between the opening structure 200 and the opening structure 100.

The opening structure 200 primarily differs from the opening structure 100 in that no upper rear wall 112 is provided and instead a deflectable latch member 212 is provided. The deflectable latch member 212 includes a deflectable arm portion 212*a* and a catch portion 212*b*. In one aspect, the deflectable latch member 212 is positioned relative to the lower rear wall 214 to define the opening height H1 in a relaxed state, or in a slightly deflected state. The latch member 212 is deflectable to create a greater opening dimension between the latch member 212 and the lower rear wall 214 such that the opening height H2 can be achieved. Accordingly, with the incorporation of the deflectable latch member 212, the opening structure 200 can accommodate either a KJ-style jack 10 or a SL-style jack 20. The opening structure 200 is also configured such that the side walls 104, 106 have rear surfaces 104*d*, 106*d* against the side stops 18 of a KJ-style jack 10 can abut, when installed. This configuration therefore does not include the use of an adapter to facilitate the installation of a KJ-style jack. To aid in guiding and or securing the jack within the passageway 218, the side walls 204, 206 can also be provided with ribs or guide portions 204*e*, 206*e*. In the example shown, the opening structure 200 is shown as being provided without ribs similar to ribs 112. However, such features could be integrated into the opening structure 200. Similarly, the opening structure 100 could be provided without the ribs 112 in some configurations. The deflectable latch member 212 is also provided with a handle or tool surface 212*c* such that a finger or tool can be used to deflect the latch member 212 in an upward direction away from an installed jack such that the installed jack can be removed from the opening structure 200.

In one aspect, the opening structure 200 can be characterized as having a first attachment arrangement 270 including the lower rear wall 214, the deflectable latch member 212, and the rear surfaces 204*d*, 206*d* of the side walls 204, 206. FIGS. 41 to 46 show a KJ-style jack 10 engaged with the first attachment arrangement 270. The opening structure 200 can also be characterized as having a second attachment arrangement 280 including recesses 204*b*, 206*b* and catch surfaces 204*c*, 206*c* and including the rear surfaces 104*d*, 106*d* of the side walls 204, 206. FIGS. 53 to 58 show an M-style jack 30 engaged with the second attachment arrangement 280. The opening structure 200 can be further characterized as having a third attachment arrangement 290 including the lower rear wall 214 and the deflectable latch member 212. FIGS. 47 to 52 show an SL-style jack 20 engaged with the third attachment arrangement 290.

Although a single opening structure 200 is defined by the main body 202, any number of opening structures 200 may be provided in single or multiple rows and/or single or multiple columns in a one or two dimensional array. Additionally, one or more opening structures 200 may be integrally formed with a wall plate or panel structure having additional features.

Opening Structure 300

Referring to FIGS. 59 to 66, a third example of an opening structure 300 is presented. The opening structure 200 is generally similar to the openings structure 200 and shares many features in common. Where such features are generally the same, similar reference numbers are used, but using 300-series numbers instead of 200-series numbers. Where features are generally similar, the description already presented for the opening structure 200 is applicable to opening structure 300 and need not be repeated in this section. Accordingly, this section is generally limited to the differences between the opening structure 300 and the opening structure 200.

Figure 60:
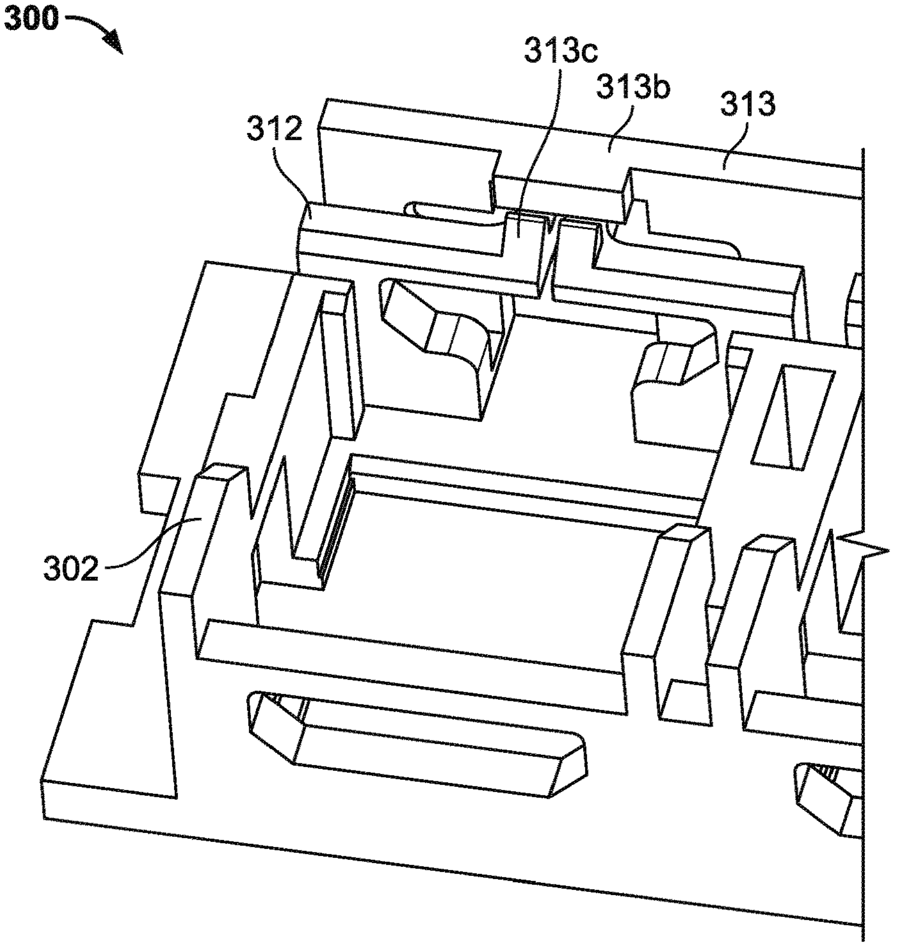
FIG. 60 is a partial rear perspective view of the opening structure of FIG. 59, with slightly different features for the latch members.

The opening structure 300 primarily differs from the opening structure 200 in that the deflectable latch member 312 is provided as two independent deflectable latch members 312. The opening structure 300 also includes an upper wall 313 positioned above the independent latch members 312. The upper wall 313 can include a recess or opening 313*a* for accommodating a deflected portion of the latch members 313. As with opening structure 200, the deflectable latch members 312 of opening structure 300 are positioned relative to the lower rear wall 314 to define the opening height H1 in a relaxed state, or in a slightly deflected state. The latch members 312 are deflectable to create a greater opening dimension between the latch members 312 and the lower rear wall 314 such that the opening height H2 can be achieved. Accordingly, the opening structure 300 can also accommodate either a KJ-style jack 10 or a SL-style jack 20. The opening structure 300 is also configured such that the side walls 304, 306 have rear surfaces 304*d*, 306*d* against the side stops 18 of a KJ-style jack 10 can abut, when installed. This configuration therefore does not include the use of an adapter to facilitate the installation of a KJ-style jack. To aid in guiding and or securing the jack within the passageway 318, the side walls 304, 306 can also be provided with ribs or guide portions 304*e*, 306*e*. In the example shown, the opening structure 300 is shown as being provided without ribs similar to ribs 112. However, such features could be integrated into the opening structure 300. FIG. 60 shows a slight variation from the configuration shown at FIG. 59 in that the deflectable latch members 312 are also provided with a catch 312*c* that engages with a stop 313*b* on the top wall 313 to prevent the latch members 313 from being opened beyond a predetermined point. The catch 312*c* can also serve as a manual or tool interface for delatching the latch members 312. It is also noted that, in this example, the lower rear wall 314 is disposed generally horizontally with an aperture 315 for receiving the latch members 16, 26 of the jacks 10, 20.

Figure 61:
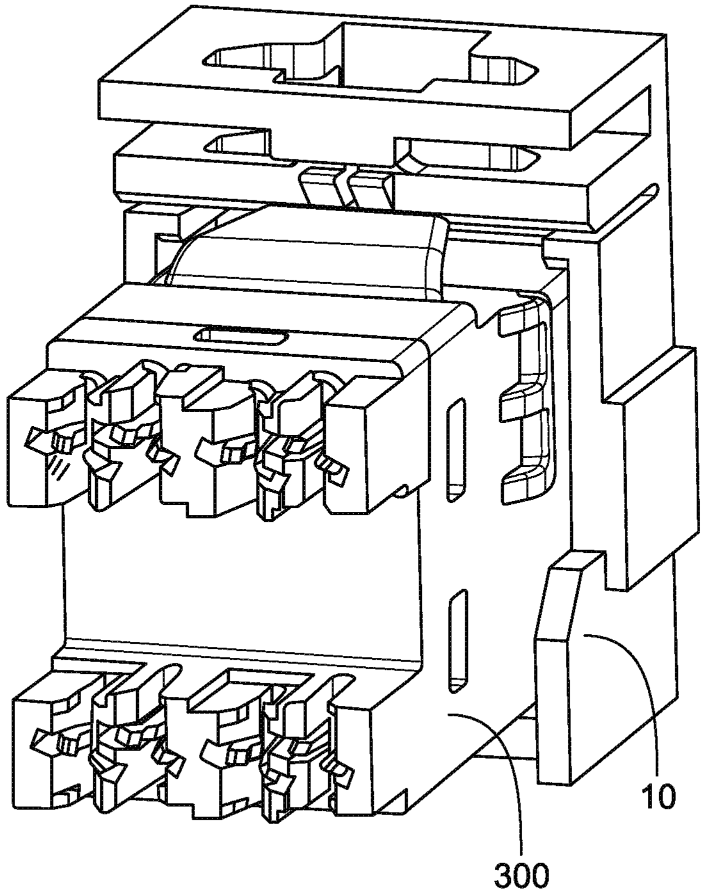
FIG. 61 is a rear perspective view of an assembly including a first jack type secured to the opening structure of FIG. 59.
Figure 62:
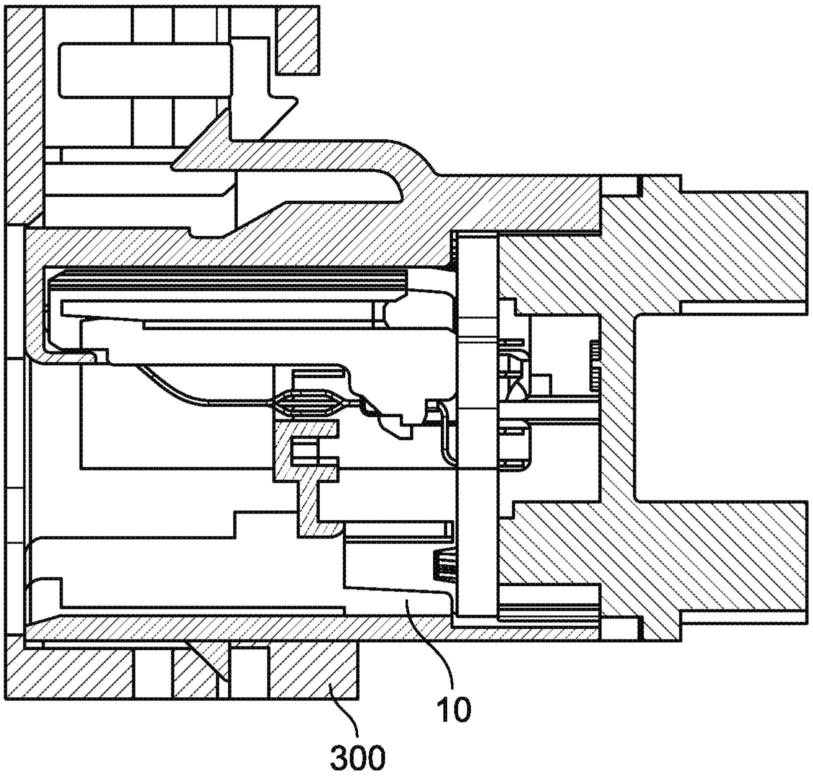
FIG. 62 is a cross-sectional side view of the assembly shown in FIG. 61.
Figure 63:
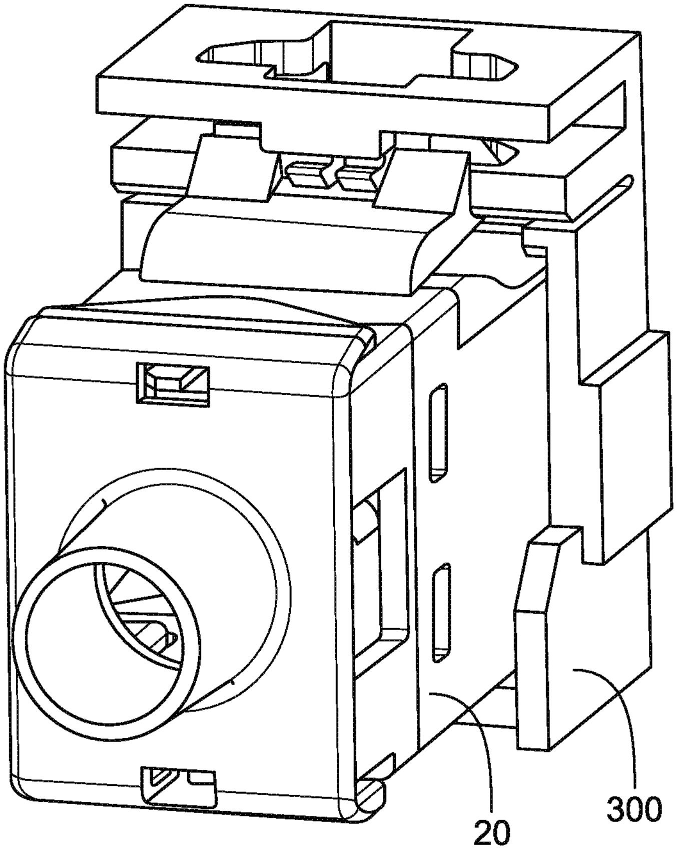
FIG. 63 is a rear perspective view of an assembly including a second jack type secured to the opening structure of FIG. 59.
Figure 64:
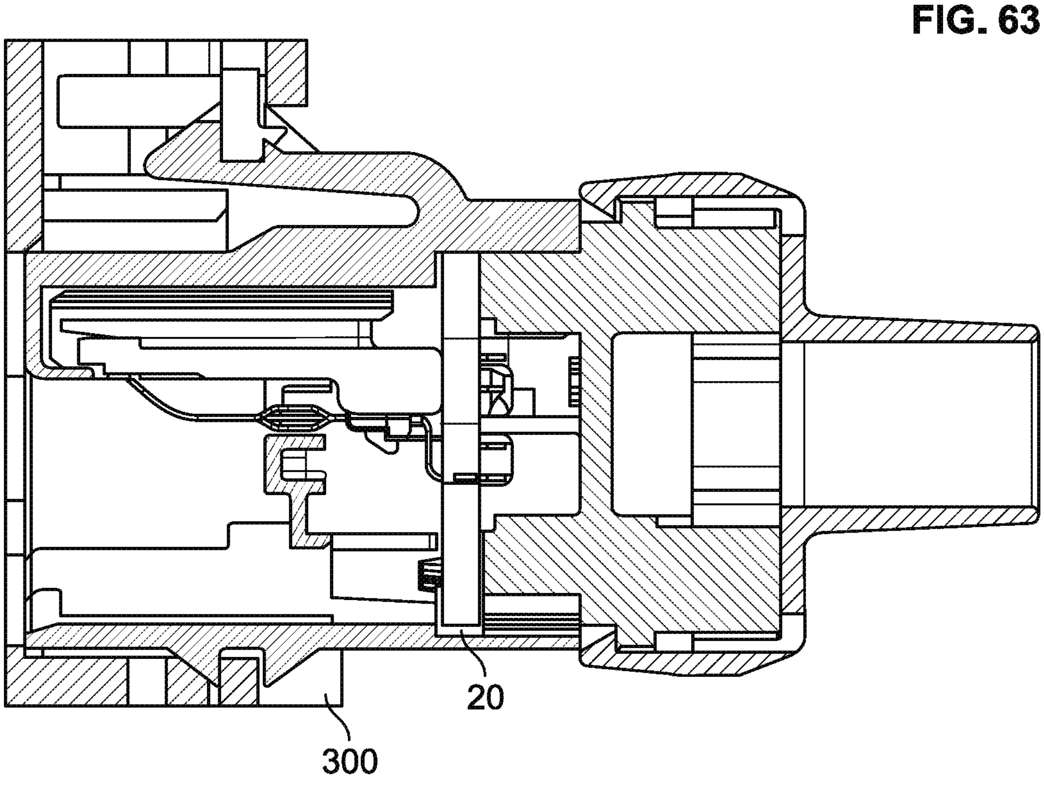
FIG. 64 is a cross-sectional side view of the assembly shown in FIG. 63.
Figure 65:
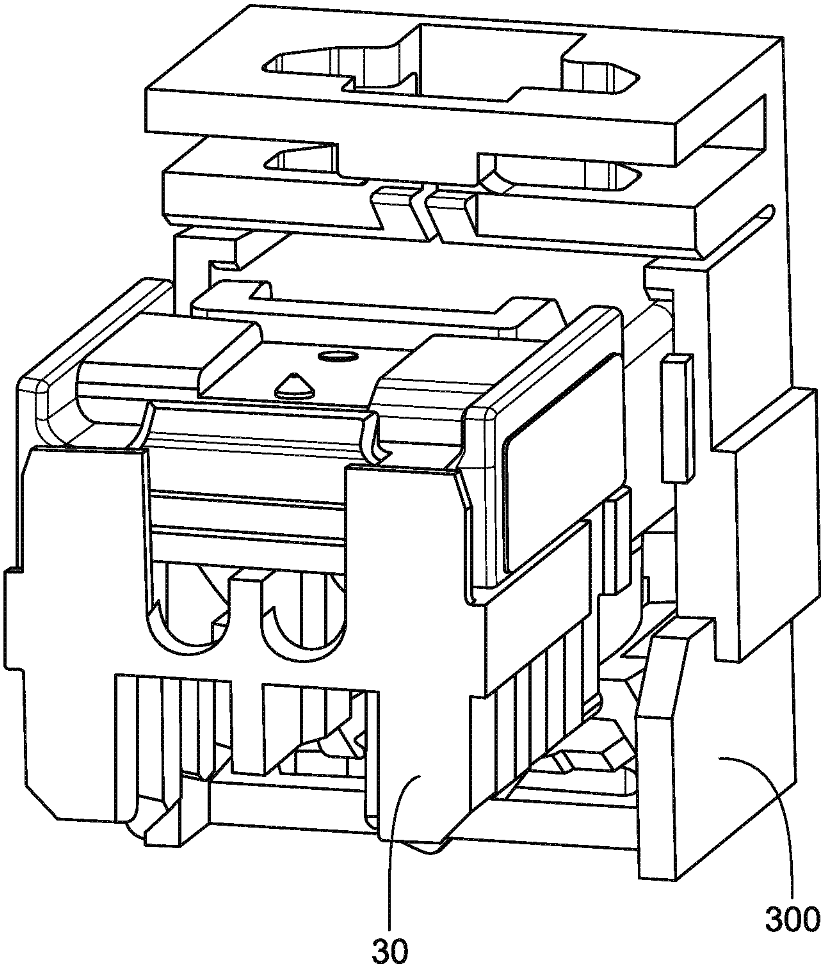
FIG. 65 is a rear perspective view of an assembly including a third jack type secured to the opening structure of FIG. 59.
Figure 66:
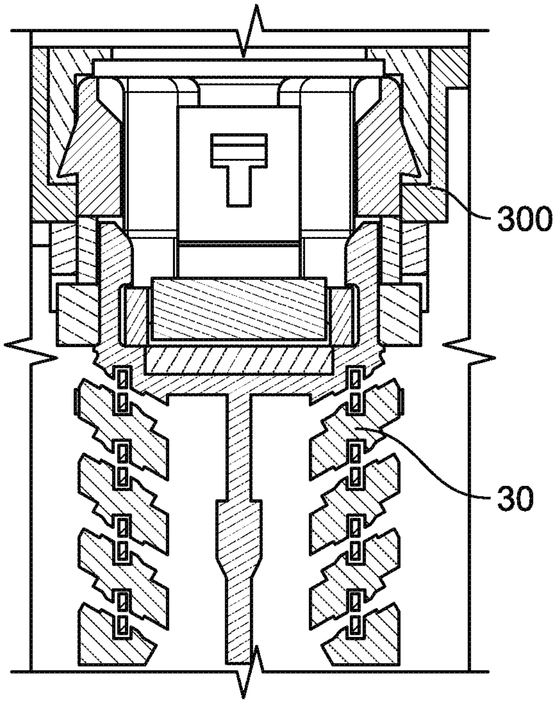
FIG. 66 is a cross-sectional side view of the assembly shown in FIG. 65.
Figure 67:
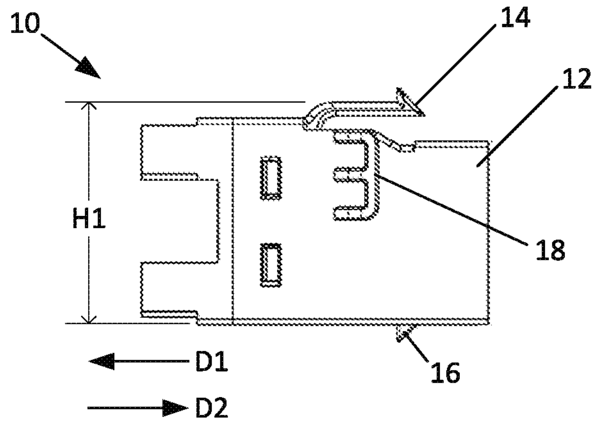
FIG. 67 is a side view of the first jack type shown in FIG. 11.
Figure 68:
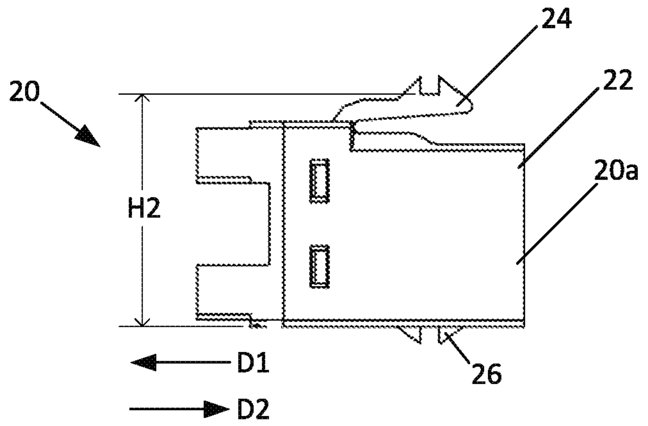
PRIOR ART FIG. 68
FIG. 68 is a side view of the second jack type shown in FIG. 19.
Figure 69:
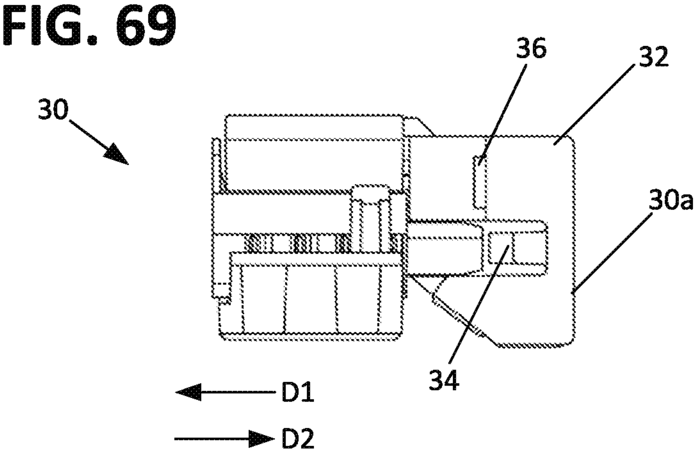
PRIOR ART FIG. 69
FIG. 69 is a side view of the third jack type shown in FIG. 25.

In one aspect, the opening structure 300 can be characterized as having a first attachment arrangement 370 including the lower rear wall 314, the deflectable latch members 312, and the rear surfaces 304*d*, 306*d* of the side walls 304, 306. FIGS. 61 to 62 show a KJ-style jack 10 engaged with the first attachment arrangement 370. The opening structure 300 can also be characterized as having a second attachment arrangement 380 including recesses 304*b*, 306*b* and catch surfaces 304*c*, 306*c* and including the rear surfaces 304*d*, 306*d* of the side walls 304, 306. FIGS. 65 to 66 show an M-style jack 30 engaged with the second attachment arrangement 380. The opening structure 300 can be further characterized as having a third attachment arrangement 390 including the lower rear wall 34 and the deflectable latch members 312. FIGS. 63 and 64 show an SL-style jack 20 engaged with the third attachment arrangement 390.

With reference to FIG. 60, it is noted that two opening structures 300 are provided in a single main body 302 in which oppositely positioned latching members 303 are provided such that the main body 302 can be snap-fit to another structure. Although two opening structures 300 are defined by the main body 302, any number of opening structures 200 may be provided in single or multiple rows and/or single or multiple columns in a one or two dimensional array. Additionally, one or more opening structures 300 may be integrally formed with a wall plate or panel structure having additional features.

In the examples shown, the first, second, and third attachment arrangements are shown as being integrally formed with the main body of the opening structure. However, other approaches are possible. In some examples, the opening structures are formed from a polymeric material, such as an injection molded plastic. Other materials are possible.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. An opening structure for receiving a telecommunications jack, the opening structure comprising:

a main body defining a first central passageway;

a first attachment arrangement for securing a first jack type to the main body within the first central passageway;

a second attachment arrangement for securing a second jack type to the main body within the first central passageway; and a third attachment arrangement for securing a third jack type to the main body within the first central passageway;

wherein the first, second, and third attachment arrangements have different connection arrangements from each other for respectively receiving the first, second, and third jack types within the first central passageway.

2. The opening structure of claim 1, wherein the first attachment arrangement includes at least one rear-facing surface of the main body acting as a stop surface for side stops of the first jack type, and includes an upper edge and a lower edge located at opposite sides of the first central passageway for engaging with single-sided latch members of the first jack type.

3. The opening structure of claim 1, wherein the first jack type is a keystone type jack, the second jack type is a COMMSCOPE M-series type jack, and the third jack type is a COMMSCOPE SL-series type jack.

4. The opening structure of claim 1, wherein the second attachment arrangement includes oppositely positioned recesses and catch surfaces located on opposite sides of the first central passageway, the catch surfaces being for engaging laterally positioned latch members of the second jack type.

5. The opening structure of claim 1, wherein the third attachment arrangement includes only upper and lower edges for engaging with double-sided latch members of the third jack type.

6. The opening structure of claim 1, wherein the first, second, and third attachment arrangements are integrally formed with the main body.

7. The opening structure of claim 1, wherein the main body includes a deflectable latch member.

8. The opening structure of claim 7, wherein the deflectable latch member includes a pair of deflectable latch members.

9. The opening structure of claim 7, wherein the deflectable latch member forms at least a portion of the first and third attachment arrangements.

10. The opening structure of claim 1, further including an adapter part for installation on the first jack type and for connection with the first attachment arrangement.

11. An opening structure for receiving a telecommunications jack, the opening structure comprising:

a main body defining a central passageway;

a lower edge located at a lower side of the central passageway;

a deflectable latch member located opposite the lower edge and at an upper side of the central passageway;

a rear-facing surface oriented orthogonally to the central passageway; and a pair of catch surfaces located on lateral sides of the central passageway;

wherein, when a first jack type is installed in the central passageway, the first jack type engages with the lower edge and the deflectable latch member and against the rear-facing surface;

wherein, when a second jack type is installed in the central passageway, the second jack type engages with the pair of catch surfaces and against the rear-facing surface;

wherein, when a third jack type is installed in the central passageway, the third jack type engages with the lower edge and the deflectable latch member without the third jack type abutting the rear-facing surface.

12. The opening structure of claim 11, wherein the first jack type is a keystone type jack, the second jack type is a COMMSCOPE M-series type jack, and the third jack type is a COMMSCOPE SL-series type jack.

13. The opening structure of claim 11, wherein the lower edge, the deflectable latch member, the rear-facing surface, and the pair of catch surfaces are integrally formed with the main body.

14. The opening structure of claim 11, wherein the deflectable latch member includes a pair of deflectable latch members.

15. A telecommunications jack connection kit comprising:

a main body defining a first central passageway, the main body defining:

a first attachment arrangement for securing a first jack type to the main body within the first central passageway;

a second attachment arrangement for securing a second jack type to the main body within the first central passageway; and an adapter defining a third attachment arrangement for securing a third jack type to the adapter, the adapter being configured for connection to the first attachment arrangement;

wherein the first, second, and third attachment arrangements have different connection arrangements from each other for respectively receiving the first, second, and third jack types.

16. The telecommunications jack connection kit of claim 15, wherein the first attachment arrangement includes an upper edge and a lower edge located at opposite sides of the first central passageway for engaging with single-sided latch members of the first jack type.

17. The telecommunications jack connection kit of claim 15, wherein the first jack type is a keystone type jack, the second jack type is a COMMSCOPE M-series type jack, and the third jack type is a COMMSCOPE SL-series type jack.

18. The telecommunications jack connection kit of claim 15, wherein the second attachment arrangement includes oppositely positioned recesses and catch surfaces located on opposite sides of the first central passageway, the catch surfaces configured for engaging laterally positioned latch members of the second jack type.

19. The telecommunications jack connection kit of claim 15, wherein the first and second attachment arrangements are integrally formed with the main body.

* * * * *